United States Patent
Zhang et al.

(10) Patent No.: US 12,513,417 B2
(45) Date of Patent: Dec. 30, 2025

(54) IMAGE PROCESSING DEVICE, IMAGING DEVICE, AND IMAGE PROCESSING METHOD

(71) Applicant: Sony Group Corporation, Tokyo (JP)

(72) Inventors: Ting Zhang, Tokyo (JP); Masafumi Wakazono, Tokyo (JP)

(73) Assignee: Sony Group Corporation, Tokyo (JP)

( * ) Notice: Subject to any disclaimer, the term of this patent is extended or adjusted under 35 U.S.C. 154(b) by 147 days.

(21) Appl. No.: 18/559,469

(22) PCT Filed: Feb. 16, 2022

(86) PCT No.: PCT/JP2022/006240
§ 371 (c)(1),
(2) Date: Nov. 7, 2023

(87) PCT Pub. No.: WO2023/276249
PCT Pub. Date: Jan. 5, 2023

(65) Prior Publication Data
US 2024/0244334 A1    Jul. 18, 2024

(30) Foreign Application Priority Data

Jun. 29, 2021 (JP) ................................ 2021-107447

(51) Int. Cl.
*H04N 23/84* (2023.01)
*H04N 9/77* (2006.01)
*H04N 23/88* (2023.01)

(52) U.S. Cl.
CPC ........... *H04N 23/843* (2023.01); *H04N 23/88* (2023.01); *H04N 9/77* (2013.01)

(58) Field of Classification Search
CPC ........ H04N 23/843; H04N 23/88; H04N 9/77; H04N 1/608; H04N 5/77
See application file for complete search history.

(56) References Cited

U.S. PATENT DOCUMENTS 7,773,127 B2 * 8/2010 Zimmer ................. H04N 23/85
348/231.6
10,148,926 B2 * 12/2018 Getman ................. G06T 3/4015
(Continued)

FOREIGN PATENT DOCUMENTS

JP  2005176272 A  6/2005
JP  2012216888 A  11/2012
(Continued)

OTHER PUBLICATIONS

International Search Report (PCT/ISA/210), International Application No. PCT/JP2022/006240, dated Apr. 19, 2022.

*Primary Examiner* — Abdelaaziz Tissire
(74) *Attorney, Agent, or Firm* — Michael Best & Friedrich LLP

(57) ABSTRACT

An image processing device that uses YC-raw data as a development processing target includes an image processing unit that performs conversion processing, into an image sensor output format, on YC-raw data that is image data obtained by performing pre-white balance processing, demosaicing, and a YC conversion processing on image data in the image sensor output format, and further performs reverse pre-white balance processing with respect to the pre-white balance processing and remosaicing to restore a state prior to the demosaicing.

20 Claims, 22 Drawing Sheets

(56) References Cited

U.S. PATENT DOCUMENTS

| | | | |
|---|---|---|---|
| 11,838,651 B2* | 12/2023 | Kim | G06T 5/60 |
| 2005/0094007 A1* | 5/2005 | Nomura | H04N 23/843 |
| | | | 348/222.1 |
| 2006/0092302 A1* | 5/2006 | Lee | H04N 25/134 |
| | | | 348/308 |
| 2008/0013850 A1* | 1/2008 | Sakurai | G06T 5/50 |
| | | | 382/162 |
| 2010/0046859 A1* | 2/2010 | Hitomi | H04N 1/409 |
| | | | 348/222.1 |
| 2011/0222767 A1* | 9/2011 | Mitsunaga | H04N 25/134 |
| | | | 382/169 |
| 2014/0152865 A1* | 6/2014 | Ogino | H04N 23/843 |
| | | | 348/223.1 |
| 2017/0257584 A1* | 9/2017 | Fujita | G06T 3/4038 |
| 2017/0366723 A1* | 12/2017 | Kurata | H04N 25/131 |
| 2018/0041719 A1* | 2/2018 | Kurata | H04N 25/135 |

FOREIGN PATENT DOCUMENTS

| | | |
|---|---|---|
| JP | 2013219705 A | 10/2013 |
| JP | 2016005245 A | 1/2016 |
| JP | 2020151403 A | 9/2020 |
| WO | 2015012040 A1 | 1/2015 |

* cited by examiner

FIG. 4

PRIMARY COLOR FILTER

| R | G | R | G |
|---|---|---|---|
| G | B | G | B |
| R | G | R | G |
| G | B | G | B |

COMPLEMENTARY COLOR FILTER

| Cy | G  | Cy | G  |
|----|----|----|----|
| Ye | Mg | Ye | Mg |
| Cy | G  | Cy | G  |
| Ye | Mg | Ye | Mg |

W-RGB FILTER

| B | W | R | W |
|---|---|---|---|
| W | G | W | G |
| R | W | B | W |
| W | G | W | G |

FIG. 5

RGB PLANE

RAW DATA PHENOMENON PROCESSING (FIRST EMBODIMENT)

IMAGE PROCESSING DEVICE, IMAGING DEVICE, AND IMAGE PROCESSING METHOD

TECHNICAL FIELD

The present technology relates to an image processing device, an imaging device, and an image processing method, and particularly relates to a technology of development processing for a raw image.

BACKGROUND ART

In image recording, not only image data generated by performing development processing on an output of an image sensor, for example, Joint Photographic Experts Group (JPEG) image data is recorded, but also raw data is recorded.

The raw data is recorded in a form that can reproduce a signal obtained from the image sensor almost as it is, and it is thus possible to perform, as post-processing on the recorded raw data, development processing in which a desired development parameter is specified to adjust gradation, hue, and the like. This enables a user to obtain a developed image that aligns more closely with his or her preference, as compared to a method in which color reproduction processing or the like is performed within the imaging device, followed by recording.

The raw data may refer to image data in an image sensor output format, and related to the recording of raw data, there is a method of recording image data in the image sensor output format, for example, signals for red (R), green (G), and blue (B) from a primary color filter array as they are. For description, an example of such raw data is referred to as RGB-raw data.

Furthermore, in order to suppress the amount of data during storage, there is a method of performing a certain degree of signal processing, including white balance processing, within an imaging device, separating the signal into a luminance signal and a chrominance signal, and recording the signals as raw data in YCbCr format. The raw data that has undergone up to YC conversion processing, as described above, is referred to as YC-raw data.

Patent Document 1 below discloses processing of an image corresponding to YC-raw data.

Furthermore, Patent Document 2 below discloses processing related to the reliability of white balance of raw data.

Note that "white balance" is also referred to as "WB" below.

CITATION LIST

Patent Document

Patent Document 1: Japanese Patent Application Laid-Open No. 2016-5245
Patent Document 2: Japanese Patent Application Laid-Open No. 2005-176272

SUMMARY OF THE INVENTION

Problems to be Solved by the Invention

Meanwhile, in order to record an image in a YCbCr format as YC-raw data, it is necessary to first perform WB processing on an image sensor output, such as a signal in an RGB format in a Bayer array, perform demosaicing after the WB processing, and estimate a missing color value of each pixel of the image, thereby creating a color image. These missing color values are estimated using color information from surrounding pixels, and thus, in a case where the value of the WB processing (WB gain) cannot be set correctly, the missing color value of each pixel of the image cannot also be estimated correctly. As can also be understood from Patent Document 2 above, the WB processing is affected by various factors such as a color of a subject, a light source, and a detection method, making it difficult to perform correct calculation in a short period of time. For example, it is difficult to set an appropriate WB value at a high speed during imaging.

Furthermore, a color shift may deteriorate due to demosaicing.

As a result, when YC-raw data is later developed, a developed image, such as JPEG image data, is generated with the influence of the color shift remaining.

Therefore, the present disclosure proposes image processing to correct the influence of color shift, which can be applied during development of YC-raw data or at other times.

Solutions to Problems

An image processing device according to the present technology includes an image processing unit that performs conversion processing, into an image sensor output format, on YC-raw data that is image data obtained by performing pre-white balance processing, demosaicing, and a YC conversion processing on image data in the image sensor output format, and further performs reverse pre-white balance processing with respect to the pre-white balance processing and remosaicing to restore a state prior to the demosaicing.

For example, simple pre-white balance processing or demosaicing performed during the imaging of YC-raw data may lead to a color shift compared to the original image in the development of the YC-raw data. With the above configuration, the color shift is corrected for the YC-raw data.

Furthermore, an image processing device according to the present technology includes a recording control unit that records image data in an image sensor output format or YC-raw data onto a recording medium, the image data having been obtained after conversion processing into the image sensor output format is performed on YC-raw data that is image data obtained by performing pre-white balance processing, demosaicing, and a YC conversion processing on image data in the image sensor output format, and reverse pre-white balance processing with respect to the pre-white balance processing and remosaicing to restore a state prior to the demosaicing are further applied, the YC-raw data having been obtained on the basis of the image data in the image sensor output format obtained after the remosaicing.

In other words, raw data, which is image data after application of color shift correction processing including the reverse pre-white balance processing and the remosaicing, is overwritten and recorded onto the original YC-raw data. Alternatively, the recording is performed together with the original YC-raw data.

An imaging device according to the present technology includes: an imaging unit that obtains captured image data using an image sensor; an image processing unit that performs pre-white balance processing, demosaicing, and YC conversion processing on image data in an image sensor output format obtained by the imaging unit to generate YC-raw data; and a control unit that performs processing to associate, with YC-raw data, sensor array information indicating a pixel array of the image sensor as metadata used in remosaicing to restore a state prior to the demosaicing, and pre-white balance information including a parameter of the pre-white balance processing as metadata used in reverse pre-white balance processing with respect to the pre-white balance processing.

For example, the sensor array information and the pre-white balance information are added to the metadata associated with the YC-raw data so as to be available for reference during development processing.

BRIEF DESCRIPTION OF DRAWINGS

FIG. 4 is an explanatory diagram of an example of a pixel array of an image sensor.

FIG. 5 is an explanatory diagram of an RGB-plane signal prior to remosaicing.

MODE FOR CARRYING OUT THE INVENTION

Figure 1:
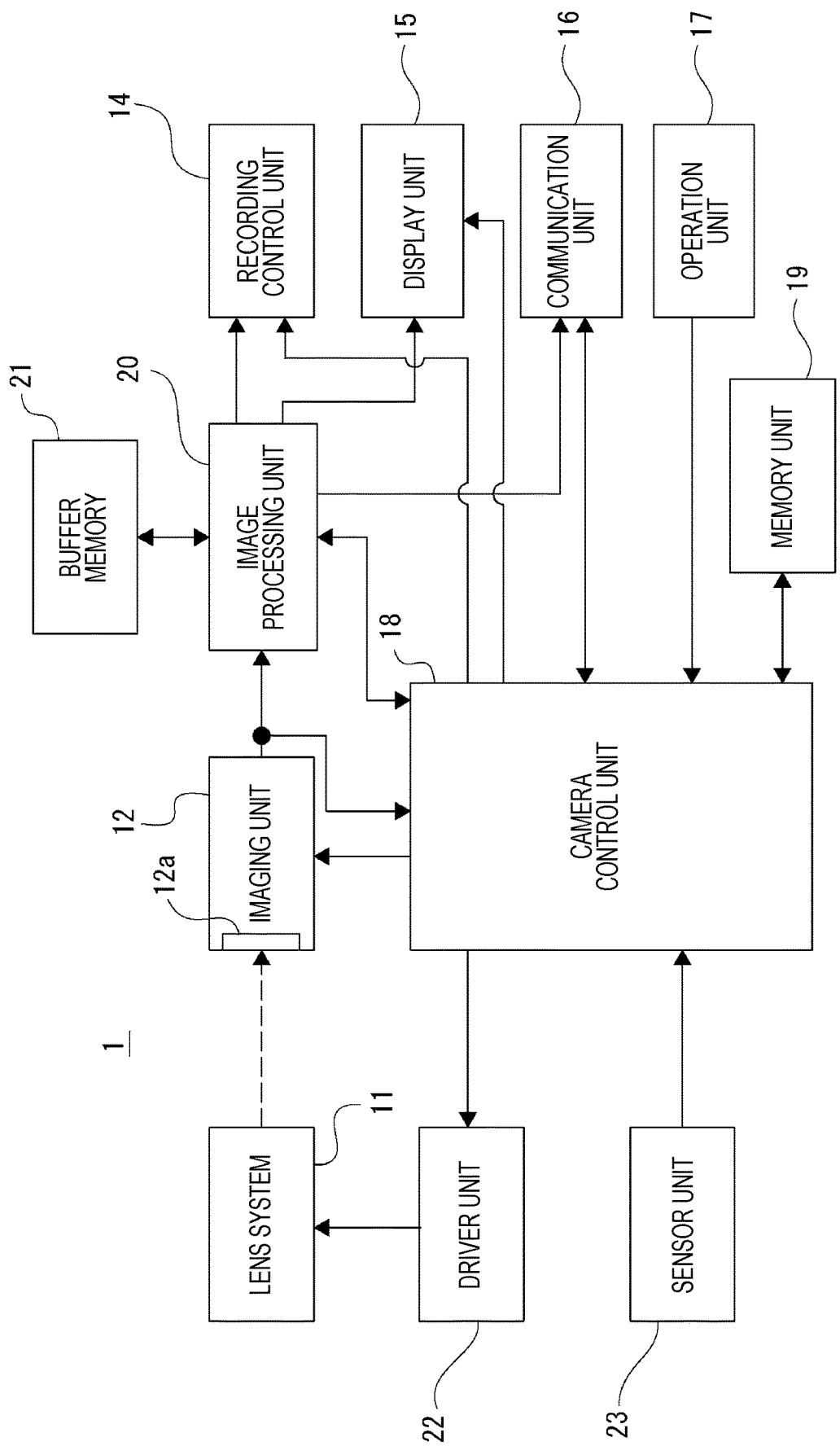
FIG. 1 is a block diagram of an imaging device according to an embodiment of the present technology.

Hereinafter, an embodiment is described in the following order.
 <1. Configuration of imaging device>
 <2. Configuration of information processing device>
 <3. YC-raw data imaging processing>
 <4. Comparative example of YC-raw data development>
 <5. First Embodiment: YC-raw data development>
 <6. Second Embodiment: YC-raw data development>
 <7. Third Embodiment: overwrite recording of YC-raw>
 <8. Fourth Embodiment: processing with color shift correction execution determination>
 <9. Summary and modification examples>

1. Configuration of Imaging Device

The image processing device according to the embodiment of the present technology is assumed to be mounted as an image processing unit in an imaging device (camera) or an information processing device that performs raw data development or the like. Furthermore, each of the imaging device and the information processing device, equipped with image processing units, can also be considered as the image processing device of the embodiment of the present technology.

First, a configuration example of an imaging device 1 will be described with reference to FIG. 1.

The imaging device 1 includes an image processing unit 20 that performs generation processing for YC-raw data according to imaging and performs development on the YC-raw data, and the image processing unit 20 or the imaging device 1 including the image processing unit 20 can be considered as an example of the image processing device of the present technology.

The YC-raw data generated by the imaging device 1 is image data obtained by performing pre-white balance processing, demosaicing, and YC conversion processing on image data in an image sensor output format, such as an RGB format, obtained by an imaging operation. Resizing for changing the pixel size (the number of pixels) may be performed.

However, this YC-raw data is not subjected to processing related to image enhancement, such as color reproduction processing, gamma processing, or sharpness processing, and can be said to be a type of raw data.

The imaging device 1 includes, for example, a lens system 11, an imaging unit 12, a recording control unit 14, a display unit 15, a communication unit 16, an operation unit 17, a camera control unit 18, a memory unit 19, an image processing unit 20, a buffer memory 21, a driver unit 22, and a sensor unit 23.

The lens system 11 includes lenses such as a zoom lens and a single focus lens, a diaphragm mechanism, and the like. The lens system 11 guides light (incident light) from a subject and condenses the light on the imaging unit 12.

The imaging unit 12 includes, for example, an image sensor 12*a* of a complementary metal-oxide-semiconductor (CMOS) type, a charge-coupled device (CCD) type, or the like.

The imaging unit 12 performs, for example, correlated double sampling (CDS) processing, automatic gain control (AGC) processing, and the like on an electric signal obtained by photoelectrically converting light received by the image sensor 12*a*, and further performs analog to digital (A/D) conversion processing. Then, an imaging signal as digital data is output to the image processing unit 20 and the camera control unit 18 in a subsequent stage.

The image processing unit 20 is configured as an image processing processor using, for example, a digital signal processor (DSP) or the like.

The image processing unit 20 performs various types of signal processing on the digital signal (captured image signal) from the imaging unit 12. The various types of processing include, for example, pre-processing, white balance (WB) processing, demosaicing, color/gradation processing, YC conversion processing, resolution conversion processing, and various types of detection processing.

The image processing unit 20 performs defect correction and black level adjustment on the signal from the image sensor 12a, for example, as pre-processing.

As described later, the image processing unit 20 performs, as the WB processing, simple WB processing to generate YC-raw data, and original WB processing performed by obtaining a WB value with high accuracy by, for example, all-pixel detection or the like, or using a WB value specified by a user.

Note that, in the present disclosure, simple WB processing during imaging for generating YC-raw data is referred to as "pre-WB processing" ("pre-white balance processing") for distinction in description. Furthermore, WB processing performed by obtaining a WB value with high accuracy by all-pixel detection or the like, and WB processing performed using a WB value specified by a user, that is, WB processing reflected on a final developed image, are referred to as "main WB processing" ("main white balance processing").

In addition, the image processing unit 20 may perform reverse pre-WB processing to cancel the pre-WB processing by using a WB value reverse to the pre-WB processing.

As the demosaicing, the image processing unit 20 performs demosaicing so that image data for each pixel has all color components of R, G, and B. In addition, the image processing unit 20 may perform remosaicing to return the demosaiced image data to the state prior to the demosaicing.

In the YC conversion processing, the image processing unit 20 performs processing to generate (separate) a luminance signal and a chrominance signal from the image data in the RGB format to obtain image data in a YCbCr format.

In the color and gradation processing, processing to adjust gradation, saturation, tone, contrast, and the like is performed as so-called image enhancement.

The image processing unit 20 performs, for example, each processing as described above as necessary, and generates YC-raw data or developed image data for the image data from the image sensor 12a.

In this case, resolution conversion or file formation processing may be performed. In the file formation processing, the image data is subjected to, for example, compression encoding for recording or communication, formatting, generation or addition of metadata, or other processing to generate a file for recording or communication.

For example, image files in formats such as JPEG, tagged image file format (TIFF), graphics interchange format (GIF), high efficiency image file format (HEIF), YUV 422, and YUV 420 are generated as still image files. Furthermore, it is also conceivable to generate an image file as an MP4 format or the like used for recording moving images and audio conforming to MPEG-4.

The buffer memory 21 is formed using a dynamic random-access memory (D-RAM), for example. The buffer memory 21 is used in the image processing unit 20 to temporary store image data in the course of the various types of processing described above.

The recording control unit 14 performs recording onto and reproduction from a recording medium using a non-volatile memory, for example. The recording control unit 14 performs processing to record an image file such as moving image data or still image data onto the recording medium, for example.

The actual form of the recording control unit 14 is variously conceivable. For example, the recording control unit 14 may be configured as a flash memory built in the imaging device 1 and its write/read circuit. Furthermore, the recording control unit 14 may be in the form of a card recording/reproduction unit that performs recording/reproducing access to a recording medium detachable from the imaging device 1, for example, a memory card (portable flash memory, etc.). In addition, the recording control unit 14 may be achieved as a hard disk drive (HDD) or the like as a form built in the imaging device 1.

The display unit 15 is a display unit that performs various displays for the user, and is, for example, a display panel or a viewfinder using a display device such as a liquid crystal display (LCD) or an organic electro-luminescence (EL) display disposed in the housing of the imaging device 1.

The display unit 15 executes various displays on a display screen on the basis of instructions from the camera control unit 18. For example, the display unit 15 displays a reproduced image of the image data read from the recording medium in the recording control unit 14.

Furthermore, there is a case where image data of a captured image with its resolution converted for display by the image processing unit 20 is supplied to the display unit 15, and the display unit 15 performs display on the basis of the image data of the captured image in response to an instruction from the camera control unit 18. As a result, a so-called through image (live view image of the subject), which is a captured image during composition confirmation, moving image recording, or the like, is displayed.

Furthermore, the display unit 15 causes display of various operation menus, icons, messages, and the like, that is, display as a graphical user interface (GUI) to be executed on the screen on the basis of instructions of the camera control unit 18.

The communication unit 16 performs data communication and network communication with an external device in a wired or wireless manner. For example, a still image file or a moving image file including captured image data or metadata is transmitted and output to an external information processing device, display device, recording device, reproduction device, or the like.

Furthermore, the communication unit 16 can perform communication via various networks such as the Internet, a home network, and a local area network (LAN) as a network communication unit, and can transmit and receive various data to and from a server, a terminal, and the like on the network. The server on the network includes a so-called cloud server, and the imaging device 1 can transmit and receive various information to and from the cloud server via the communication unit 16.

Furthermore, the imaging device 1 may be able to perform information communication with a personal computer (PC), a smartphone, a tablet terminal, or the like using communication unit 16 through short-range wireless communication such as Bluetooth (registered trademark), Wi-Fi (registered trademark) communication, or near-field communication (NFC), infrared communication, or the like. In addition, the imaging device 1 and another device may be able to communicate with each other through wired connection communication.

Therefore, the imaging device 1 can transmit image data and metadata to an information processing device 70 to be described later using the communication unit 16.

The operation unit 17 collectively indicates input devices for the user to perform various operation inputs. Specifically, the operation unit 17 indicates various operation elements (keys, dials, a touch panel, a touch pad, etc.) provided in the housing of the imaging device 1.

A user operation is detected by the operation unit 17, and a signal corresponding to the input operation is transmitted to the camera control unit 18.

The camera control unit 18 includes a microcomputer (arithmetic processing device) including a central processing unit (CPU).

The memory unit 19 stores information and the like used for processing by the camera control unit 18. As the illustrated memory unit 19, for example, a read-only memory (ROM), a random-access memory (RAM), a flash memory, and the like are illustrated comprehensively.

The memory unit 19 may be a memory area built in a microcomputer chip as the camera control unit 18 or may include a separate memory chip.

The camera control unit 18 executes a program stored in the ROM, the flash memory, or the like of the memory unit 19 to control the entire imaging device 1.

For example, the camera control unit 18 controls operations of each necessary unit related to control of the shutter speed of the imaging unit 12, instructions of various types of signal processing in the image processing unit 20, an imaging operation and a recording operation in response to a user operation, a reproduction operation of a recorded image file, operations of the lens system 11 such as zooming, focusing, and diaphragm adjustment in a lens barrel, a user interface operation, and the like.

The RAM in the memory unit 19 is used for temporary storage of data, programs, and the like as a work area for various types of data processing of the CPU of the camera control unit 18.

The ROM and the flash memory (nonvolatile memory) in the memory unit 19 are used for storing an operating system (OS) for the CPU to control each unit, content files such as image files, application programs for various operations, firmware, various setting information, and the like.

The driver unit 22 is provided with, for example, a motor driver for a zoom lens drive motor, a motor driver for a focus lens drive motor, a motor driver for a diaphragm mechanism motor, and the like.

In these motor drivers, a drive current is applied to the corresponding driver in response to an instruction from the camera control unit 18 to cause movement of the focus lens and the zoom lens, opening and closing of the diaphragm blade of the diaphragm mechanism, and the like to be executed.

The sensor unit 23 comprehensively indicates various sensors mounted on the imaging device.

For example, in a case where an inertial measurement unit (IMU) is mounted as the sensor unit 23, angular velocity can be detected by an angular velocity (gyro) sensor for the three axes of pitch, yaw, and roll, and acceleration can be detected by an acceleration sensor, for example.

As the sensor unit 23, for example, a position information sensor, an illuminance sensor, a distance measurement sensor, or the like may be mounted.

Various information detected by the sensor unit 23, such as position information, distance information, illuminance information, and IMU data are added as metadata to the captured image together with date and time information managed by the camera control unit 18.

By providing an illuminance sensor capable of detecting a color temperature as the sensor unit 23, the camera control unit 18 can estimate a light source during imaging, and for example, can add light source information to metadata. The case of using an illuminance sensor separate from the imaging device 1 is naturally conceivable.

2. Configuration of Information Processing Device

Figure 2:
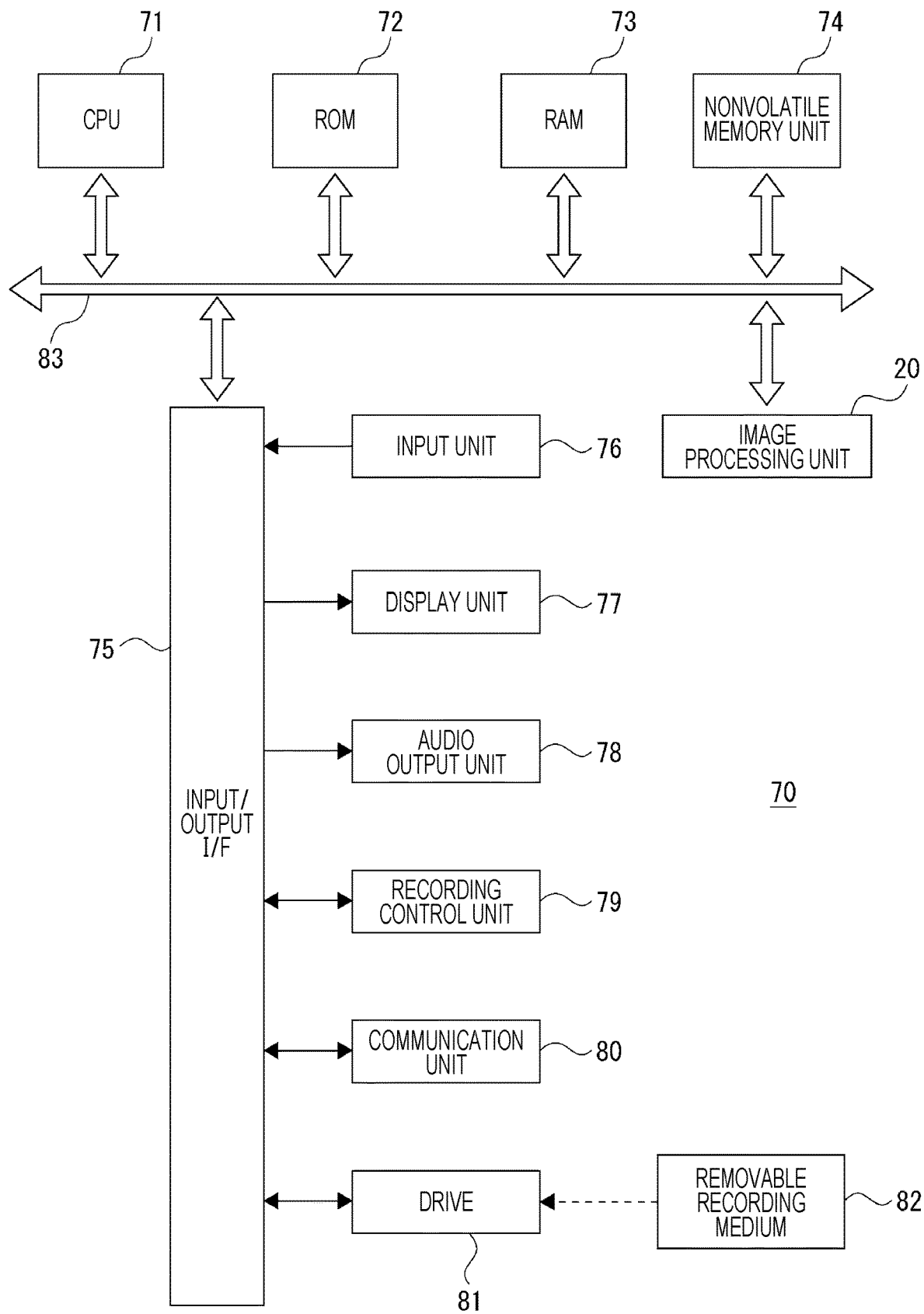
FIG. 2 is a block diagram of an information processing device according to the embodiment.

Next, a configuration example of the information processing device 70 will be described with reference to FIG. 2.

The information processing device 70 is a device capable of performing information processing, particularly image processing, such as a computer device. Specifically, a personal computer (PC), a mobile terminal device such as a smartphone or a tablet, a mobile phone, a video editing device, a video reproducing device, or the like is assumed as the information processing device 70. Furthermore, the information processing device 70 may be a computer device configured as a server device or an arithmetic device in cloud computing.

Then, the information processing device 70 includes the image processing unit 20 that performs development processing for the YC-raw image data, and the image processing unit 20 or the information processing device 70 including the image processing unit 20 can be considered as an example of the image processing device of the present disclosure.

A CPU 71 of the information processing device 70 executes various types of processing in accordance with a program stored in a nonvolatile memory unit 74 such as a ROM 72 or an electrically erasable programmable read-only memory (EEP-ROM), or a program loaded from a recording medium into a RAM 73 by the recording control unit 79. In addition, the RAM 73 also appropriately stores data and the like necessary for the CPU 71 to execute the various types of processing.

The image processing unit 20 performs, for example, white balance processing, demosaicing, color/gradation processing, YC conversion processing, resolution conversion processing, various detection processing, and the like on the image data. In particular, the development processing for the YC-raw data is performed by the above processing to generate a developed image, for example, JPEG image data. In the case of the image processing unit 20 in the information processing device 70, the YC-raw data to be developed is, for example, image data captured by the imaging device 1 and captured in, for example, a recording medium in the recording control unit 79 via communication or a recording medium. The metadata generated by the imaging device 1 is also associated with the YC-raw data in that case.

Note that the function of performing the development processing for the YC-raw data as the image processing unit 20 may be provided as a function within the CPU 71.

Furthermore, the image processing unit 20 may be achieved by a CPU, a graphics processing unit (GPU), general-purpose computing on graphics processing units (GPGPU), an artificial intelligence (AI) processor, or the like that is separate from the CPU 71.

The CPU 71, the ROM 72, the RAM 73, the nonvolatile memory unit 74, and the image processing unit 20 are connected to each other via a bus 83. An input/output interface 75 is also connected to the bus 83.

An input unit 76 including an operation element and an operation device is connected to the input/output interface 75. For example, as the input unit 76, various types of operation elements and operation devices such as a keyboard, a mouse, a key, a dial, a touch panel, a touch pad, a remote controller, and the like are assumed.

A user operation is detected by the input unit 76, and a signal corresponding to the input operation is interpreted by the CPU 71.

A microphone is also assumed as the input unit 76. A voice uttered by the user can also be input as the operation information.

In addition, a display unit 77 including an LCD, an organic EL panel, or the like, and an audio output unit 78 including a speaker or the like are connected to the input/output interface 75 integrally or separately.

The display unit 77 includes, for example, a display device provided in the housing of the information processing device 70, a separate display device connected to the information processing device 70, or the like.

The display unit 77 executes display of an image for various types of image processing, a moving image to be processed, and the like on a display screen on the basis of an instruction from the CPU 71. In addition, the display unit 77 displays various types of operation menus, icons, messages, and the like, that is, displays as a graphical user interface (GUI) on the basis of the instruction from the CPU 71.

A recording control unit 79 and a communication unit 80 may be connected to the input/output interface 75.

The recording control unit 79 can record data to be processed and various programs in a recording medium such as a disk or a solid-state memory in a hard disk drive (HDD).

In a case where the information processing device 70 functions as the image processing device of the present disclosure, it is assumed that the recording control unit 79 records YC-raw data and metadata to be processed onto the recording medium, and records image data generated by development processing, such as JPEG image data, onto the recording medium.

Furthermore, the recording control unit 79 can record or read a program for development processing onto and from the recording medium.

The communication unit 80 performs communication processing via a transmission path such as the Internet, wired/wireless communication with various types of devices, bus communication, and the like.

Communication with the imaging device 1, in particular, reception of image data and the like is performed by the communication unit 80.

A drive 81 is also connected to the input/output interface 75 as necessary, and a removable recording medium 82 such as a magnetic disk, an optical disk, a magneto-optical disk, or a semiconductor memory is mounted appropriately.

The drive 81 can read a data file such as an image file, various types of computer programs, and the like from the removable recording medium 82. The read data file is stored in the recording control unit 79, and images and audio included in the data file are output by the display unit 77 and the audio output unit 78. Furthermore, the computer program and the like read from the removable recording medium 82 are recorded onto the recording medium in the recording control unit 79 as necessary.

In the information processing device 70, for example, software for the processing of the present embodiment can be installed via network communication by the communication unit 80 or the removable recording medium 82. Alternatively, the software may be stored in advance in the ROM 72, the recording medium in the recording control unit 79, or the like.

3. YC-Raw Data Imaging Processing

Imaging processing for YC-raw data by the imaging device 1 described above will be described. That is, this is processing to perform imaging, generate YC-raw data as raw data prior to development, and record the data onto the recording medium or transmit the data to the external device.

Figure 3:
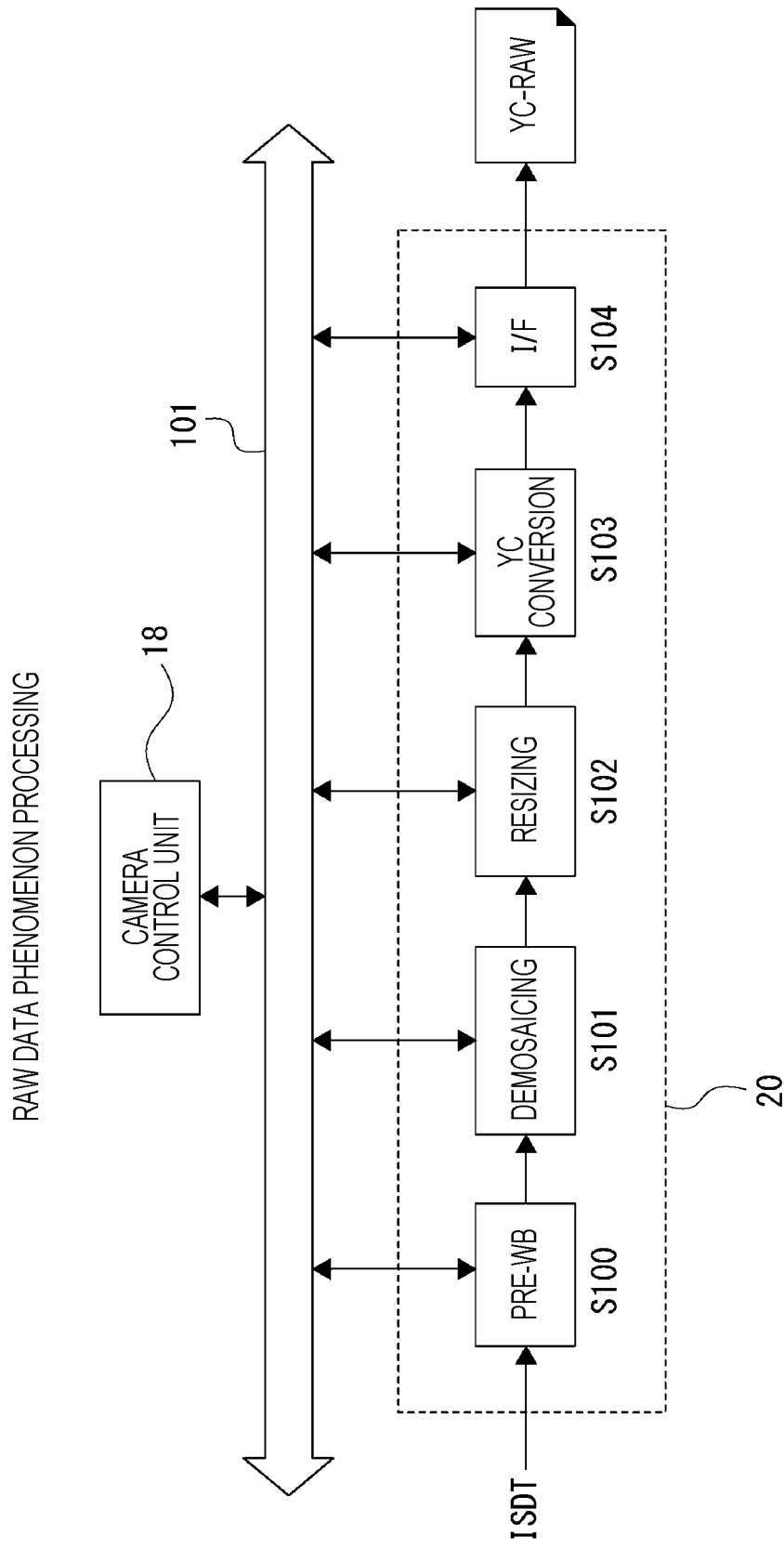
FIG. 3 is an explanatory diagram of raw data imaging processing according to the embodiment.

FIG. 3 illustrates the flow of the processing in the image processing unit 20 in a case where the raw data imaging processing is performed. Note that the camera control unit 18 and a bus 101 are illustrated in the drawing, and this indicates that each processing in the image processing unit 20 is performed according to a control signal and parameter setting by the camera control unit 18. Also, each processing performed within the image processing unit 20 is denoted by a step number (S100 to S104), and this is illustrated as a processing procedure related to the generation of YC-raw data and is a part of the processing performed in the image processing unit 20.

As described above, image data ISDT from the image sensor 12a is supplied to the image processing unit 20. The image data ISDT is image data in an image sensor output format, and is, for example, raw image data (RGB-raw data) in the RGB format with R, G, and B values remaining in the pixel array of the image sensor 12a.

As the imaging processing in the case of recording YC-raw data, the image processing unit 20 performs signal processing on the image data ISDT digitized by the imaging unit 12 in the order of pre-WB processing in step S100, demosaicing in step S101, and resizing processing in step S102.

Then, in step S103, YC conversion processing for conversion into luminance and a chrominance signal (YCbCr signal) is performed to obtain YC-raw data, and the YC-raw data is output by interface processing in step S104.

The output YC-raw data may be recorded onto the recording medium by the recording control unit 14, for example, or may be transmitted and output by the communication unit 16.

Each processing will be described.

In the pre-WB processing in step S100, a WB value (WB gain) is estimated by simple detection on the image data ISDT generated by the imaging unit 12, and for example, the RGB signal level is adjusted by applying the WB gain to the signal in the RGB format.

A WB value for internal processing is used for the WB here, and is desirably a value that makes an achromatic subject as achromatic as possible. However, in reality, in the high-speed processing in the case of raw data recording, WB processing using a previous frame value of a live view, or WB processing through simple detection, low-precision high-speed calculation, or the like, is performed in order to reduce the calculation time for obtaining pre-WB.

When the WB value of the previous frame is used, a difference from the proper value of the current frame may occur. In addition, according to the simple detection, according to the ow-precision high-speed calculation, or the like, it is difficult to obtain an appropriate WB value for the current frame, and a difference from a completely achromatic WB value occurs.

In the demosaicing in step S101, the demosaicing is performed using the image data processed in the pre-WB processing, and a color image is created by estimating a missing color value of each pixel of the image.

The missing color value is estimated using color information from surrounding pixels. There is a plurality of common demosaicing methods such as an interpolation-based method, a feature-based method, and a Bayesian method, but in general, the color of a signal after interpolation tends to be lighter so as to suppress the occurrence of false color Therefore, after the RGB signal affected by the difference due to the pre-WB is demosaiced, the color shift further deteriorates.

Note that, in the demosaicing described here, there are many examples in which an image signal with one pixel indicating each color component, such as an image signal of three primary colors, is generated from an image signal with one pixel indicating one color component, but the demosaicing is not limited to the three primary colors, and a four-color image or the like may be generated.

Furthermore, the pixel arrangement of the image sensor 12a is typically a Bayer pattern, but the technology of the present disclosure can be applied to other image arrangements. That is, various specifications are assumed for the image sensor 12a.

For example, FIG. 4 illustrates a case where a primary color filter is used, a case where a complementary color filter is used, and a case where a W-RGB filter is used as examples of the pixel array of the image sensor 12a.

The illustrated example of the primary color filter is an example of a case of a Bayer array in which G, B, and R are included at a ratio of 2:1:1, and is an array based on a block of each pixel of "R", "G", "G", and "B". The first pixel is an R pixel.

In the example of the complementary color filter, an array is based on blocks of four complementary color pixels of "Cy (cyan)", "Ye (yellow)", "G", and "Mg (magenta)". The first pixel is a Cy pixel.

In the example of the W-RGB filter, an array is based on blocks of four pixels of "B", "W (white)", "R", and "G". The first pixel is a B pixel.

These are, of course, examples of the pixel array of the image sensor 12a, and various other pixel arrays can be assumed.

Figure 5:
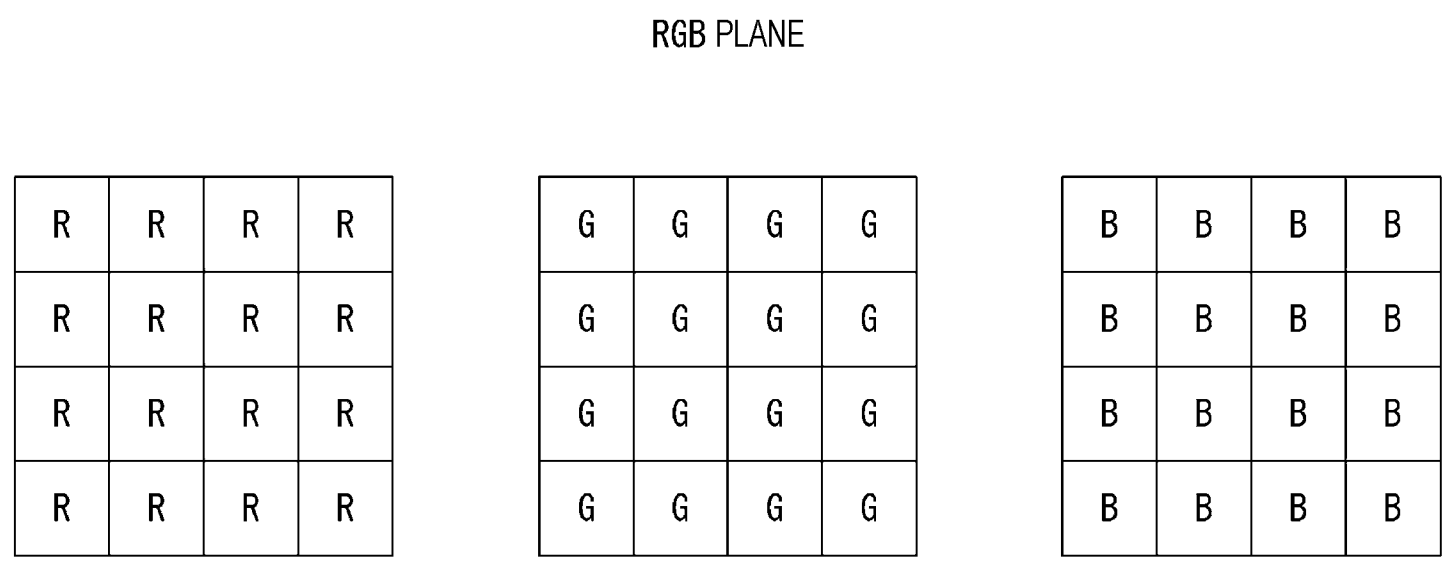

In a case where the image sensor 12a has, for example, a pixel array using the primary color filter, image data called an RGB plane as illustrated in FIG. 5 is obtained by the demosaicing.

In the resizing processing in step S102 in FIG. 3, the amount of data is reduced by converting the image size to achieve high-speed storage of raw data and memory saving. Here, it is desirable to avoid image quality degradation due to resizing by interpolation processing rather than simple down-sampling.

Note that the resizing processing may not be performed.

The YC conversion processing in step S103 is processing to convert the image data after the demosaicing into luminance data and chrominance data. This generates raw image data as YC-raw data.

The YC-raw data is recorded within the imaging device 1 or transmitted and recorded into the external device such as the information processing device 70.

Figure 6:
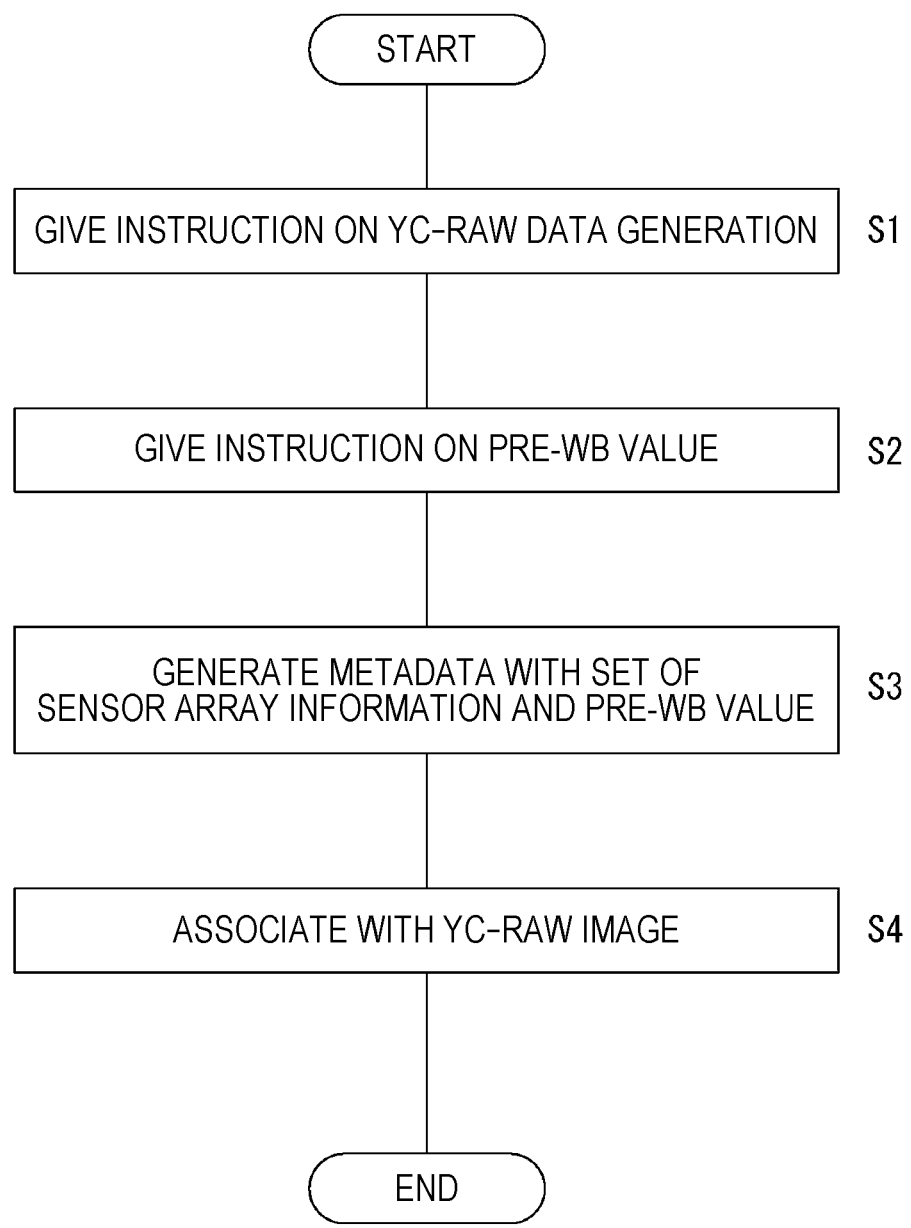
FIG. 6 is a flowchart of metadata association with YC-raw data according to the embodiment.

The imaging and recording processing for the YC-raw data has been described above, and during the processing, the processing is instructed by the camera control unit 18, and the metadata is associated. FIG. 6 illustrates a processing example of the camera control unit 18 for this purpose.

In the processing example of FIG. 6, the camera control unit 18 instructs the image processing unit 20 to generate YC-raw data in step S1. That is, an instruction is made to generate and record YC-raw data from the image data ISDT captured by the imaging unit 12. As a result, the image processing unit 20 executes each processing of FIG. 3 described above.

In step S2, the camera control unit 18 instructs the camera control unit 18 on the parameters of the pre-WB processing, that is, the WB value. For example, the camera control unit 18 calculates a WB value on the basis of simple detection processing by the image processing unit 20, and instructs the image processing unit 20 on the WB value of the calculation result. Alternatively, the camera control unit 18 instructs the image processing unit 20 on the WB value of the previous frame. The image processing unit 20 performs pre-WB processing using the instructed WB value as step S100 described above.

Note that the WB value may be calculated within the image processing unit 20. In this case, in step S2, the camera control unit 18 acquires the WB value used in the pre-WB processing from the camera control unit 18.

In step S3, the camera control unit 18 generates metadata forming a set of sensor array information and the WB value (pre-WB information) used for the pre-WB processing. Forming a set in this case means adding information indicating that each of the sensor array information and the pre-WB information is data to be used for the subsequent development processing for YC-raw data.

The sensor array information is information for returning the image data brought into the state of the RGB plane in FIG. 5 by the demosaicing to the state of the original sensor array by remosaicing, which will be described later. Hence it is conceivable that the sensor array information includes information of the filter type and first pixel for determining the pixel array, as illustrated in FIG. 4. For example, in a case where the primary color filter of the Bayer array in FIG. 4 is used for the image sensor 12a, the camera control unit 18 includes, as the sensor array information, information that the filter type is the "RGGB" type of the three primary colors RGB and the first pixel is "R". However, the sensor array information may be any information as long as the pixel value of the image sensor output and the interpolation pixel value by demosaicing can be identified.

Furthermore, the pre-WB information is used for reverse pre-WB processing to be described later. That is, in the reverse pre-WB processing, the WB value in the pre-WB processing is included in the metadata to be able to restore the state where the pre-WB processing has not been applied by using a value reverse to the WB value used during the pre-WB processing.

In step S4 of FIG. 6, the camera control unit 18 associates the generated metadata, that is, the set of the sensor array information and the WB value with the YC-raw data generated by the image processing unit 20. For example, in a case where a still image using YC-raw data is obtained by single-shooting or continuous-shooting imaging as a still image, the WB value of the pre-WB processing and the sensor array information are associated with the YC-raw data as the still image and recorded onto the recording medium. Alternatively, the metadata is transmitted to the external device together with the YC-raw data as the still image.

In a case where each frame of the YC-raw data is recorded as a moving image, the WB value of the pre-WB processing and the sensor array information are associated and recorded for each frame. Note that the sensor array information does not change for each frame and may thus be associated with the entire moving image file of the YC-raw data.

Note that the sensor array information is used for the remosaicing to be described later, but may not need to be associated with YC-raw data as metadata.

For example, it is also assumed that the remosaicing is performed by the image processing unit 20 within the imaging device 1 at a later time point. In that case, the sensor array information is only required to be stored in the memory unit 19 or the like within the imaging device 1 in advance. Furthermore, even in a case where the remosaicing is performed by the image processing unit 20 in the information processing device 70, when there is correspondence data between the information of the model of the imaging device 1 and the sensor array information in the information processing device 70, the sensor array information to be referred to during the remosaicing can be obtained.

Figure 7:
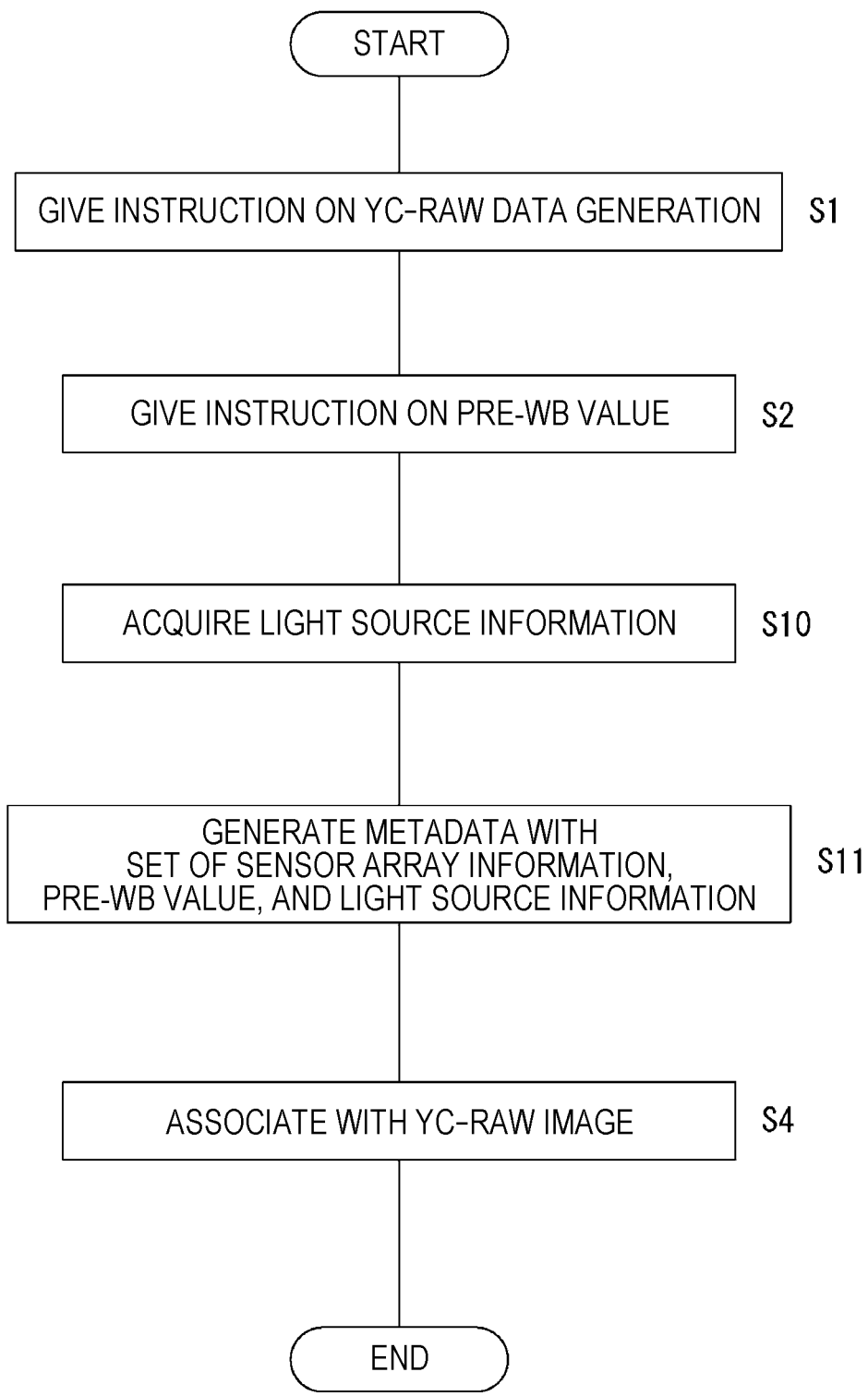
FIG. 7 is a flowchart of metadata association with YC-raw data according to the embodiment.

FIG. 7 illustrates another processing example of metadata generation by the camera control unit 18.

Steps S1 and S2 are similar to those in FIG. 6. In step 510, the camera control unit 18 acquires light source information. For example, the estimation information of the light source type in the imaging environment, the color temperature itself, or other information is acquired as the light source information from the information of the illuminance sensor in the sensor unit 23.

In step S11, the camera control unit 18 includes the light source information into the set in addition to the WB value of the pre-WB processing and the sensor array information described with reference to FIG. 6, and adds information indicating that the light source information is data to be used for development processing for subsequent YC-raw data, thereby generating metadata.

Then, in step S4, control is performed to record or transmit the set of the sensor array information, the WB value, and the light source information in association with the YC-raw data in a similar manner to the example of FIG. 6.

In the imaging device 1, in a case where the YC-raw data is generated by imaging as in the processing of FIG. 6 or 7 described above, information used for the subsequent reverse pre-WB processing, remosaicing, or development processing for the YC-raw data can be associated with the YC-raw data as metadata.

4. Comparative Example of YC-Raw Data Development

The development processing for the YC-raw data will be described below. First, a development processing example as a comparative example, which does not include color shift correction, in an embodiment to be described later will be described with reference to FIG. 8.

Note that the development processing for the YC-raw data to be described below (the comparative example and the example of the embodiment) may be assumed to be performed by the image processing unit 20 in the imaging device 1 and may also be assumed to be performed by the image processing unit 20 in the information processing device 70.

Therefore, the name "control unit 100" is used for description related to FIG. 8, as well as FIGS. 10, 12, and 14 and other drawings that will be described later. The "control unit 100" is a term indicating each of the camera control unit 18 in FIG. 1 and the CPU 71 in FIG. 2. That is, the component for controlling the image processing unit 20 in the imaging device 1 or the information processing device 70 is referred to as the "control unit 100".

Figure 8:
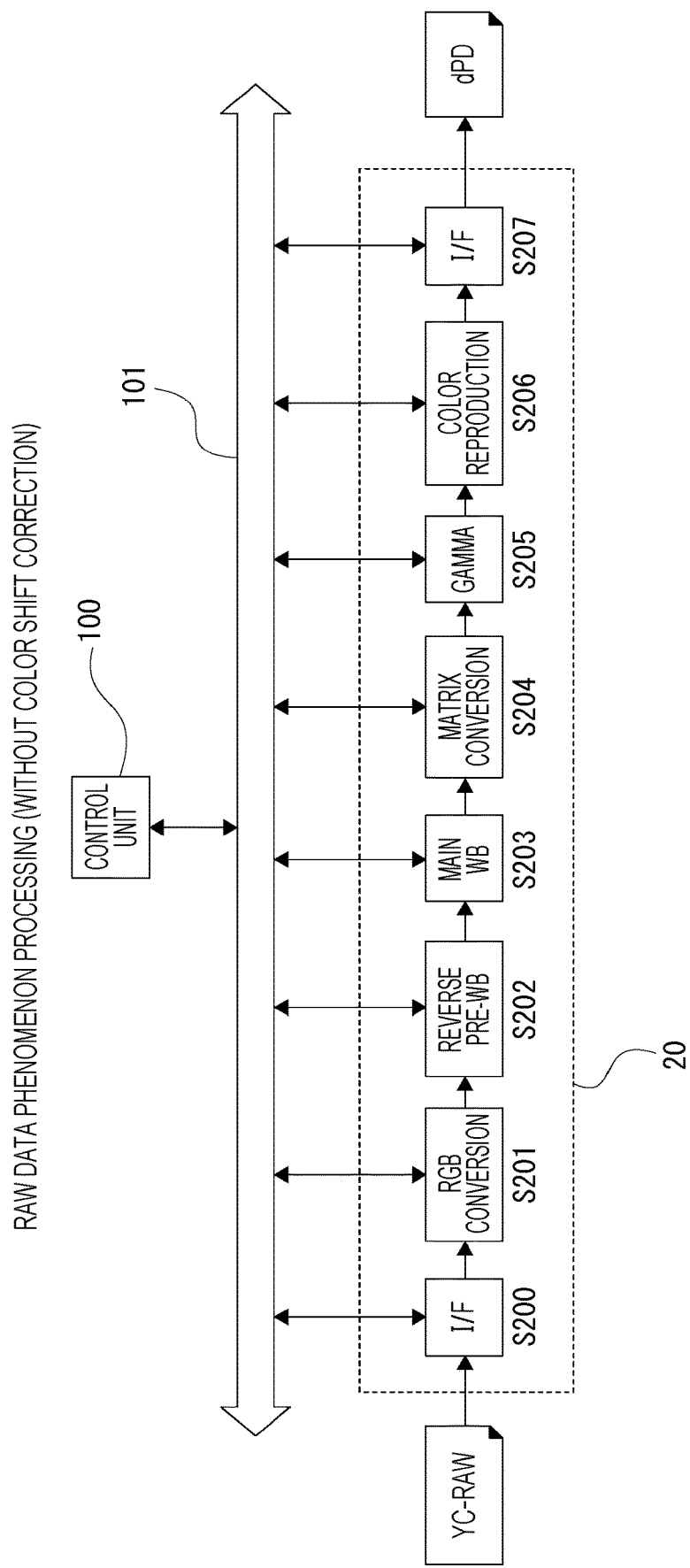
FIG. 8 is an explanatory diagram of raw data development processing without color shift correction.

The development processing by the image processing unit 20 as the comparative example in FIG. 8 is performed as follows.

For example, YC-raw data recorded onto the recording medium is read and input to the image processing unit 20.

The image processing unit 20 fetches YC-raw data set as a development processing target in the interface processing in step S200.

The YC-raw data was generated by performing the high-speed calculation pre-WB processing during the YC-raw data imaging processing described with reference to FIG. 3, and hence it is necessary to eliminate an error in the pre-WB. Therefore, the image processing unit 20 performs RGB conversion processing for converting the YC-raw data into the original image sensor output format, that is, the RGB format in this example, in step S201, and further performs reverse pre-WB processing in step S202. Thereafter, normal developing signal processing, that is, main WB processing in step S203, matrix conversion in step S204, gamma processing in step S205, and color reproduction processing in step S206, is performed. Then, in interface processing in step S207, a developed image dPD, which is image data obtained by the development processing described above, is output. The developed image dPD is, for example, JPEG image data. The developed image dPD is recorded onto the recording medium, displayed, or transmitted to the external device.

In the RGB conversion processing in step S201, conversion from the YCbCr format to the RGB format is performed using a calculation formula reverse to the format conversion used during the YC-raw data imaging processing.

Then, the reverse pre-WB processing unit in step S202 uses the reciprocal of the WB value used in the pre-WB processing during the YC-raw data imaging processing to return the RGB signal level to the level prior to the pre-WB processing, thereby canceling the difference due to the pre-WB.

However, the signal from the image sensor 12a during the YC-raw data imaging processing is a signal of intermittent data prior to the demosaicing, and on the other hand, the image data related to the reverse pre-WB processing is full plane image data in the RGB format after being interpolated by the demosaicing.

Therefore, for the RGB-plane image data converted from the YC-raw data, even when the difference due to the pre-WB processing can be canceled by the reverse pre-WB processing, the influence of color fading due to the demosaicing cannot be eliminated.

In the main WB processing in step S203, the entire frame is detected again, WB for development is calculated, and then the WB processing with high accuracy is performed. In addition, the WB value may be specified by the user according to his or her preference, purpose of development, use, or the like. In that case, priority is given to the WB value set by the user. In a case where the user does not specify the WB value, the WB value obtained by the high-accuracy detection for development described above is used.

Note that at this time, automatic exposure (AE) processing, that is, brightness adjustment, may be performed.

Here, in a case where the WB value specified by the user is used, the WB value may be set to a WB value significantly different from the ideal WB by intention, and a case is thus conceivable where the color shift caused by the demosaicing described above further deteriorates.

Figure 9:
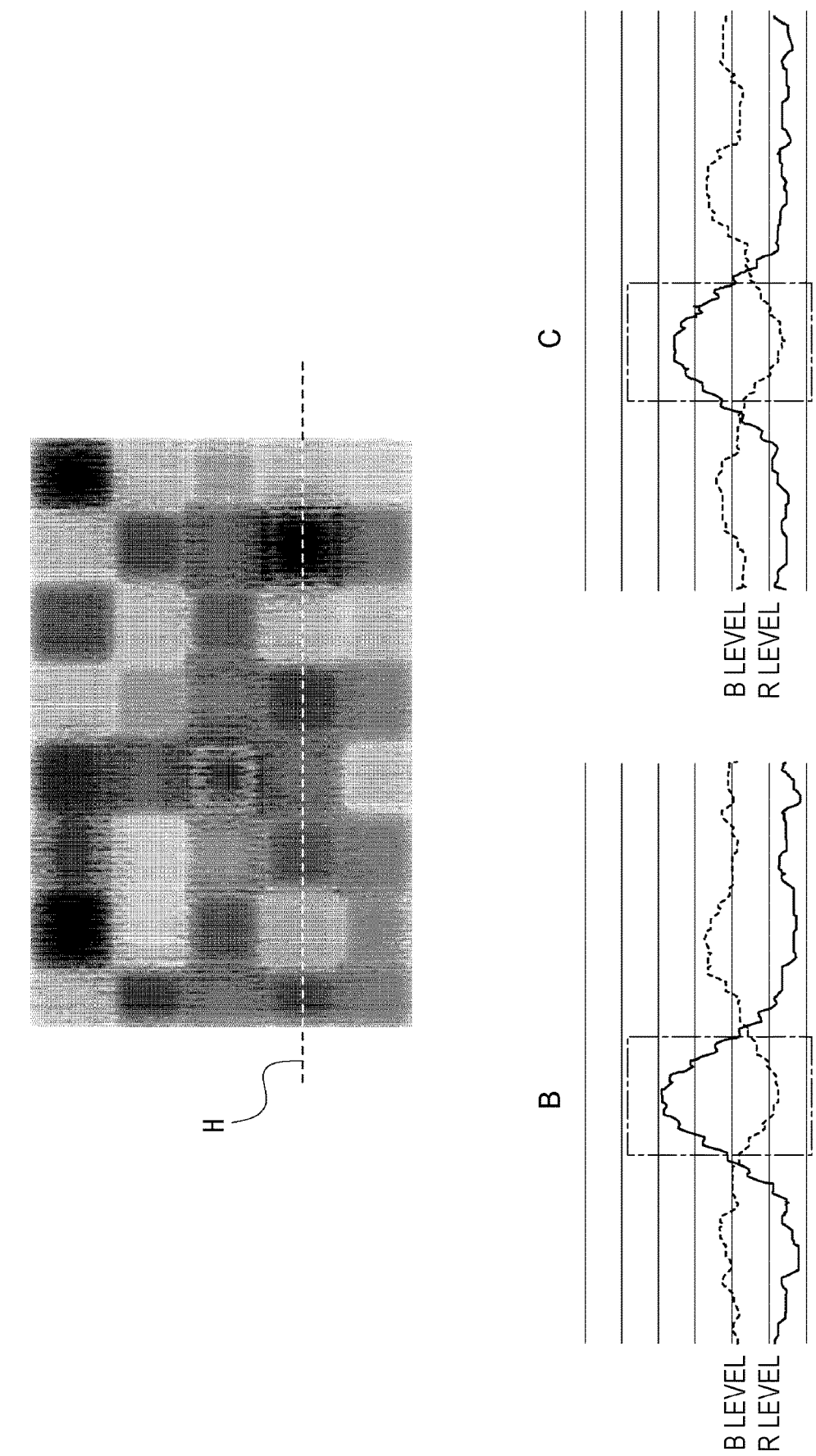
FIG. 9 is an explanatory diagram of a color shift during raw data development.

For example, FIGS. 9B and 9C illustrate the levels of the B and R values of each pixel in a portion of a broken line H in the image illustrated in FIG. 9A, indicating the state of a color shift. FIG. 9B illustrates the signal levels of the original image, and FIG. 9C illustrates the signal levels of the image in which a color shift has occurred. Note that, in this example, the G value is omitted because the level is low and the difference is small.

In FIGS. 9B and 9C, the portions surrounded by the single-dotted lines indicate a decrease in R and B values due to the influence of the difference caused by the pre-WB processing and the demosaicing, resulting in a color shift from red to orange.

In the processing of FIG. 8, after the main WB processing, matrix conversion, gamma processing, and color reproduction processing are performed in the processing from step S204 to step S206. In the color reproduction processing, color grading is also performed using a three-dimensional look-up table (3DLUT) or a color decision list (CDL). Furthermore, color space conversion is also included. Moreover, conversion into luminance and a chrominance signal (YCbCr signal) and resolution conversion may be performed.

In the development processing of FIG. 8 described above, the reverse pre-WB processing cannot fully eliminate the influence of the color shift caused by the pre-WB processing and the demosaicing during the generation of the YC-raw data. Therefore, the development processing of the embodiment described below is performed.

5. First Embodiment: YC-Raw Data Development

The development processing for the YC-raw data of the embodiment is development processing including pre-WB processing and color shift correction processing to correct a color shift caused by demosaicing.

Note that the development processing including the color shift correction processing refers to development processing to which at least remosaicing to be described below is added.

Figure 10:
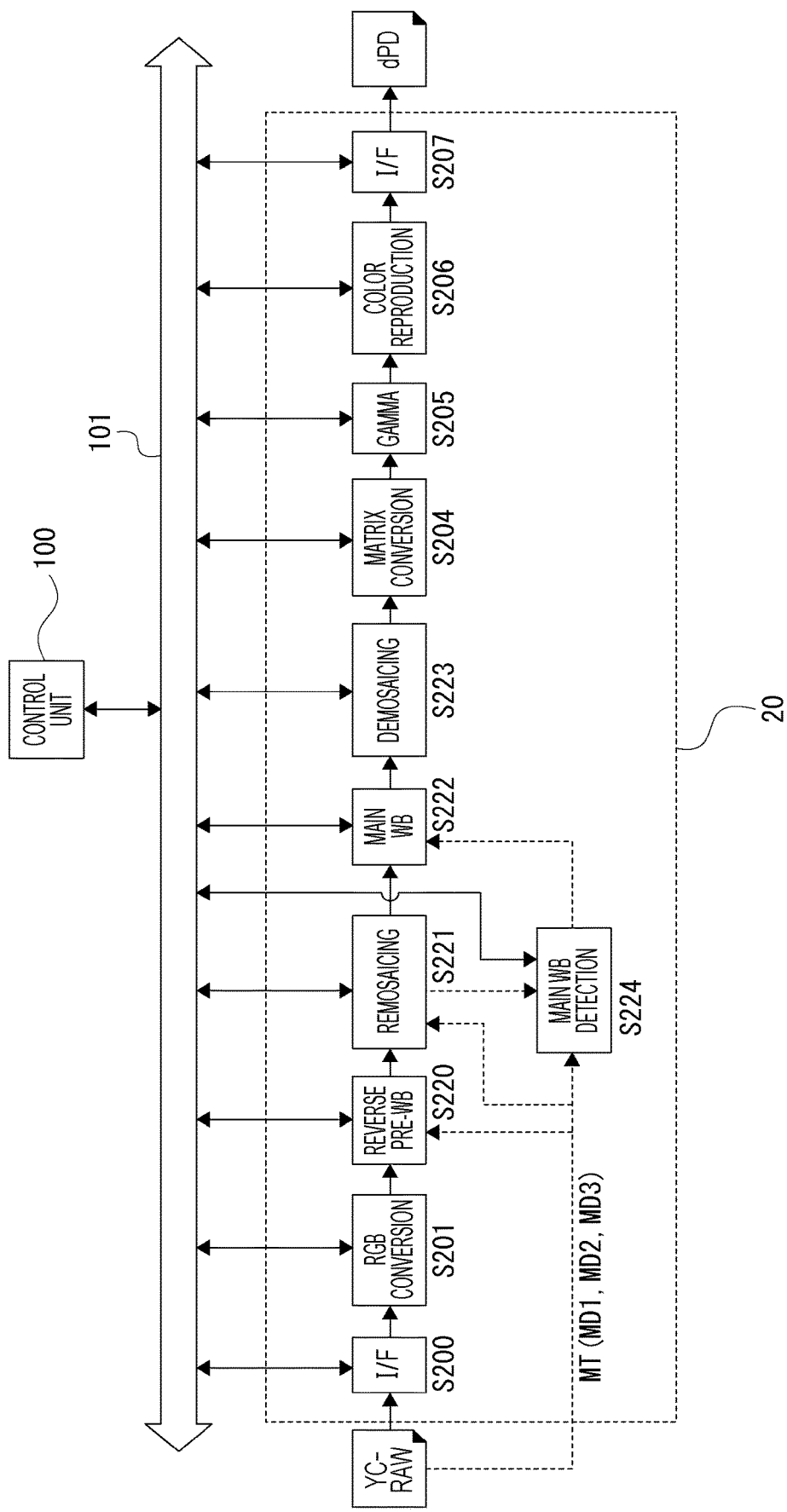
FIG. 10 is an explanatory diagram of raw data development processing according to a first embodiment.

FIG. 10 illustrates a development processing example of the image processing unit 20 in a format similar to that of FIG. 8.

The image processing unit 20 fetches YC-raw data set as a development processing target in the interface processing in step S200. For example, YC-raw data recorded onto the recording medium is read and input to the image processing unit 20.

Note that at this time, the image processing unit 20 also acquires metadata MT associated with the YC-raw data. The metadata MT includes pre-WB information MD1, which is a WB value during pre-WB processing, and sensor array information MD2 (cf. FIG. 6). Moreover, light source information MD3 may be included (cf. FIG. 7).

In step S201, the image processing unit 20 performs RGB conversion processing to convert the YC-raw data into image data in the image sensor output format, that is, image data in the RGB format in this example.

In step S220, the image processing unit 20 performs reverse pre-WB processing. At this time, the image processing unit 20 performs reverse pre-WB processing with reference to the pre-WB information MD1. That is, in the reverse pre-WB processing, the reciprocal of the WB value of the pre-WB used during the YC-raw data imaging processing is used to return the RGB signal level to the level prior to the pre-WB processing, thereby canceling the difference due to the pre-WB. However, as described above, the influence of color fading due to the demosaicing during the YC-raw data imaging processing cannot be eliminated.

Therefore, the image processing unit 20 performs remosaicing in step S221. This is processing to return the image data after the demosaicing to the state of the raw data obtained from the image sensor 12a with reference to the sensor array information MD2.

Figure 11:
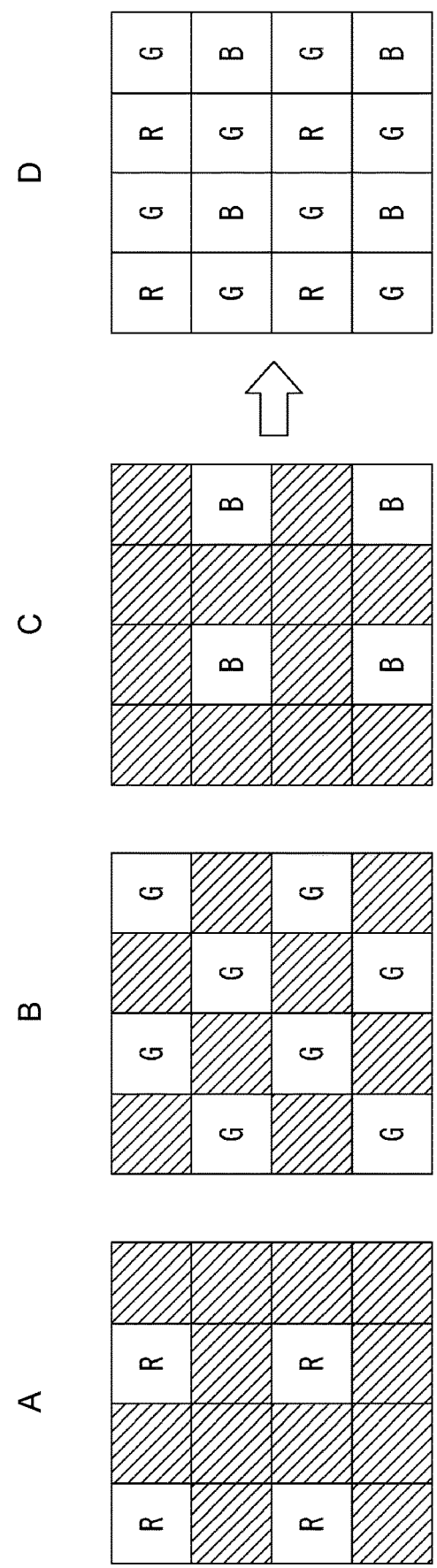
FIG. 11 is an explanatory diagram of a signal after remosaicing.

The image data prior to the remosaicing in step S221 is the RGB-plane data illustrated in FIG. 5. The first pixel and the pixel array pattern can be acquired as the sensor array information MD2, so that the pixel arrangements of the respective colors as illustrated in FIGS. 11A, 11B, and 11C can be specified. Therefore, it is possible to restore the RGB-raw data according to the pixel array of the original image sensor output format as illustrated in FIG. 11D from the RGB-plane pixel data. This is the remosaicing. That is, this is processing to refer to the sensor array information MD2, discard interpolated pixels and leave only pixel values obtained as the pixel signals of the image sensor 12a.

Performing the remosaicing can eliminate the information of interpolation pixels and eliminate the color shift caused by the demosaicing.

The image processing unit 20 performs the main WB processing in step S222 on the image data subjected to the remosaicing.

For performing the main WB processing, the image processing unit 20 performs detection processing for the main WB in step S224. For example, the entire surface detection is performed using the image data in the RGB format after the remosaicing. On the basis of the detection result, for example, the WB value for the main WB processing is set in the control unit 100 (or in the image processing unit 20). Furthermore, in a case where the user performs an operation to specify a WB parameter as the WB value for the main WB, the WB value based on the user specification is set preferentially.

Here, in a case where the light source information MD3 is included in the metadata MT, it is possible to set the WB value with higher accuracy by referring to the light source information MD3 during the detection processing in step S224.

In this manner, the main WB processing in step S222 is performed using a WB value with high accuracy based on the entire surface detection or the WB value based on a user setting. Note that, at this time, AE processing may be performed.

In step S223, the image processing unit 20 performs demosaicing again. In the demosaicing in this case, the WB processing is performed in an appropriate manner, that is, with high accuracy or according to the user setting, thus preventing an unintended shift of WB from being further magnified.

In subsequent steps S204 to S207, matrix conversion processing, gamma processing, color reproduction processing, and interface processing are performed in a similar manner to the example of FIG. 8, and the developed image dPD is output.

As described above, in the development processing of the first embodiment, with reference to the pre-WB information MD1 and the sensor array information MD2 in the metadata MT, the RGB image data after the demosaicing, converted from the YC-raw data, is returned to the state of the raw data immediately after input from the imaging unit 12 by the reverse pre-WB processing (S220) and the remosaicing (S221). This eliminates the influence of the color shift caused by the demosaicing during YC-raw data imaging. Therefore, the main WB processing (S222) is performed thereafter, followed by the demosaicing (S223) and each processing after the matrix conversion processing (S204), whereby it is possible to obtain the developed image dPD in which the influence of the color shift caused by the demosaicing during the YC-raw data imaging does not appear.

6. Second Embodiment: YC-Raw Data Development

Development processing for YC-raw data according to a second embodiment will be described with reference to FIG. 12.

In recent years, post-processing has become more active, and WB is thus specified by a user in an increasing number of cases. From the viewpoint of signal processing, it is considered better for the total image quality when matrix conversion and color reproduction in the subsequent stage are also adjusted in conjunction with WB.

Furthermore, in a case where a user preference is grasped in advance, it is desirable from the viewpoint of usability to recommend the development processing according to the user preference.

Therefore, it is conceivable to perform development processing in a plurality of systems.

Figure 12:
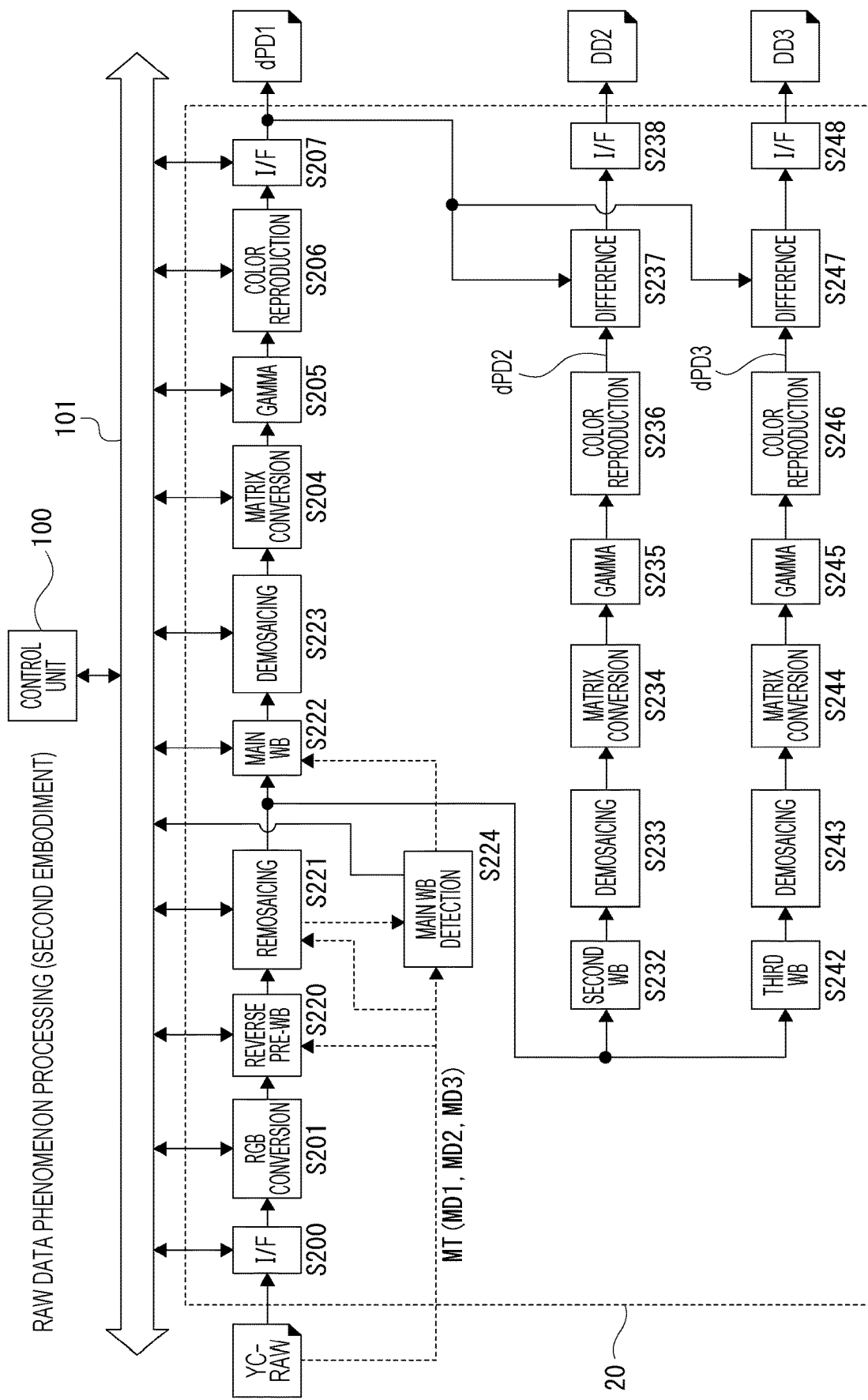
FIG. 12 is an explanatory diagram of raw data development processing of a second embodiment.

In FIG. 12, the processing in steps S200, S201, S220, and S221, that is, the processing up to and including the remosaicing, is similar to that in FIG. 10, and thus, redundant description is avoided.

FIG. 12 illustrates an example in which the processing after the main WB processing is performed as the processing in the plurality of systems.

For example, the development processing as steps S222, S223, S204, S205, S206, and S207 is the processing described with reference to FIG. 10. For example, in the main WB processing in step S222, the WB processing is performed using a WB value with high accuracy or a WB value based on a user setting. Then, after completion of each processing, the developed image dPD (In this case, a developed image dPD1) is finally output.

The developed image dPD1 is recorded onto the recording medium, displayed, or transmitted to the external device.

On the other hand, steps S232 to S238 indicate development processing in a second system.

In step S232, the image processing unit 20 performs WB processing using a WB value different from that of the main WB processing in step S222 as the second WB processing. For example, the WB value is another WB value specified by the user or a WB value automatically set by the control unit 100. Then, the image processing unit 20 performs demosaicing in step S233, and performs matrix conversion (S234), gamma processing (S235), and color reproduction processing (S236). As the parameter of each processing, a parameter specified by the user or a parameter set according to the WB value of the second WB processing is used.

As a result, as one of the developed images dPD, a developed image dPD2 having a hue and an image atmosphere different from those of the developed image dPD1 is generated.

Note that the developed image dPD2 after step S236 may be output as it is and recorded onto the recording medium or transmitted to the external device, but in this example, difference processing is performed in step S237.

As the difference processing, the image processing unit 20 performs a difference calculation between the developed image dPD1 and the developed image dPD2 to generate difference information DD2. The difference information DD2 is output in interface processing in step S238. The difference information DD2 is recorded onto the recording medium or transmitted to the external device in association with the developed image dPD1 described above.

In a case where a plurality of developed images dPD is recorded or transmitted as a set, direct recording or the like of each developed image dPD may not be necessary, and it is sufficient that along with one developed image serving as a reference, difference information compared to the one developed image is used for another developed image.

For example, difference information DD2 is recorded or transmitted in association with the developed image dPD1 instead of the developed image dPD2. This enables the reproduction of the developed image dPD2 and reduction in data capacity as a set of the plurality of developed images, which is advantageous for recording and communication.

Steps S242 to S248 indicate development processing in a third system.

In step S242, the image processing unit 20 performs WB processing using a WB value different from those of the main WB processing and the second WB processing as the third WB processing. For example, the WB value is still another WB value specified by the user or a WB value automatically set by the control unit 100. Then, the image processing unit 20 performs demosaicing in step S243, and performs matrix conversion (S244), gamma processing (S245), and color reproduction processing (S246). As the parameter of each processing, a parameter specified by the user or a parameter set according to the WB value of the third WB processing is used.

As a result, as one of the developed images dPD, a developed image dPD3 having a hue and an image atmosphere that are even more different from those of the developed images dPD1, dPD2 is further generated.

Note that, in this case as well, the developed image dPD3 may be output as it is and recorded onto the recording medium or transmitted to the external device, but by performing the difference processing in step S247, the capacity as a developed image set can be reduced in a similar manner to the above.

As the difference processing, the image processing unit 20 performs a difference calculation between the developed image dPD1 and the developed image dPD3 to generate difference information DD3. The difference information DD3 is output in interface processing in step S248. The difference information DD3 is recorded onto the recording medium or transmitted to the external device.

Note that the difference information DD3 may be a difference from the developed image dPD2 instead of a difference from the developed image dPD1.

In addition, in a case where a plurality of types of developed images dPD1, dPD2, dPD3 is generated, the developed image dPD1 of normal development is not necessarily used as a reference. Which developed image is used as the reference and which developed image is used as the difference information can be considered in various ways.

In FIG. 12 described above, an example of performing the development processing in three systems has been described, but processing in four or more systems may be performed, or processing in two systems may be performed. A plurality of types of developed images dPD can be obtained by performing development processing in a plurality of systems, which is two or more systems.

Figure 13:
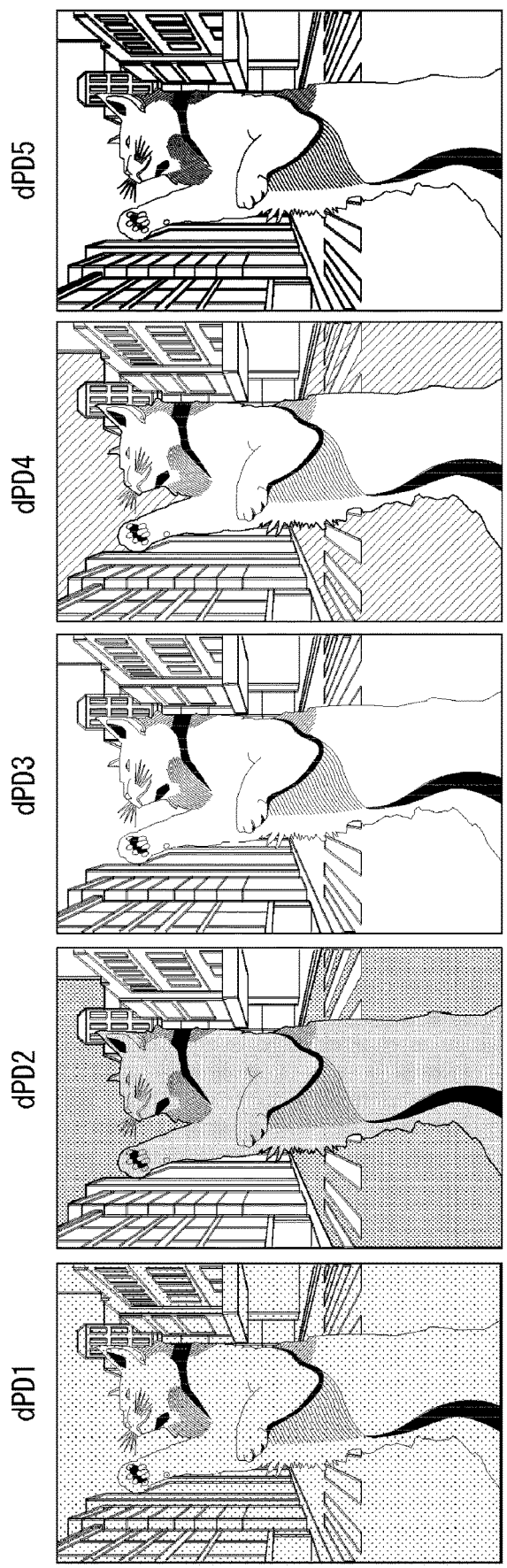
FIG. 13 is an explanatory diagram of an example of an image generated in the second embodiment.

For example, FIG. 13 illustrates an example of various developed images dPD2, dPD3, dPD4, dPD5 obtained by development processing in other systems in addition to the developed image dPD1 obtained by normal development processing. By preparing and selectively using parameter sets for the WB value, the matrix conversion, the gamma processing, and the color reproduction processing, it is possible to obtain developed images with various image qualities.

All of the plurality of types of developed images may be generated, followed by recording or transmission (hereinafter also referred to as "recording or the like"), or a developed image desired by the user may be generated, followed by recording or the like. In a case where a user can select a developed image to be subjected to recording or the like, it is also conceivable to recommend the developed image to be subjected to recording or the like to the user.

For example, it is conceivable to set parameters according to a condition/intention (e.g., hard tone/soft tone) during development, a plurality of types of WB (auto WB, cloudy weather, sunny weather), a user preference (fashion style of individuals, regions, etc., red emphasis, high saturation), and the like, and present the parameters to the user.

In that case, in order to make it easy for the user to understand, it is preferable to add titles of the image types to various parameter sets for obtaining the respective developed image as illustrated in FIG. 13.

For example, a parameter set for obtaining each of images such as the developed images dPD1, dPD2, dPD3, dPD4, dPD5 is presented to the user with titles such as "normal development", "cloudy weather", "sunny weather", "monochrome", "hard tone", and "soft tone".

The model of the image quality corresponding to each title may also be displayed so that the user can select a parameter set for desired image quality.

For example, in a case where the user selects "normal development" and "cloudy weather" in the development processing, the image processing unit 20 performs development processing in two systems to obtain the developed images dPD1, dPD2.

Alternatively, the control unit 100 may automatically select a parameter set of "normal development", "sunny weather", and "monochrome" according to a user preference, a history of past development processing, and the like, recommend the parameter set during development processing, and cause the image processing unit 20 to execute development processing of a type selected according to a user operation for the recommendation. Alternatively, the control unit 100 can also control the image processing unit 20 to automatically perform development processing in a plurality of selected systems according to a user preference or the like.

The plurality of sets of image processing parameters may be stored in the metadata MT in association with YC-raw data, for example, when YC-raw data imaging processing is performed in the imaging device 1. It is also possible to acquire one or a plurality of parameter sets with reference to the metadata MT during the development processing and reflect the acquired parameter sets in the development processing.

7. Third Embodiment: Overwrite Recording of YC-Raw

A description will be given, as a third embodiment, a processing example in which YC-RAW data subjected to the color shift correction by the image processing unit 20 is overwritten and recorded onto the original YC-RAW data.

Figure 14:
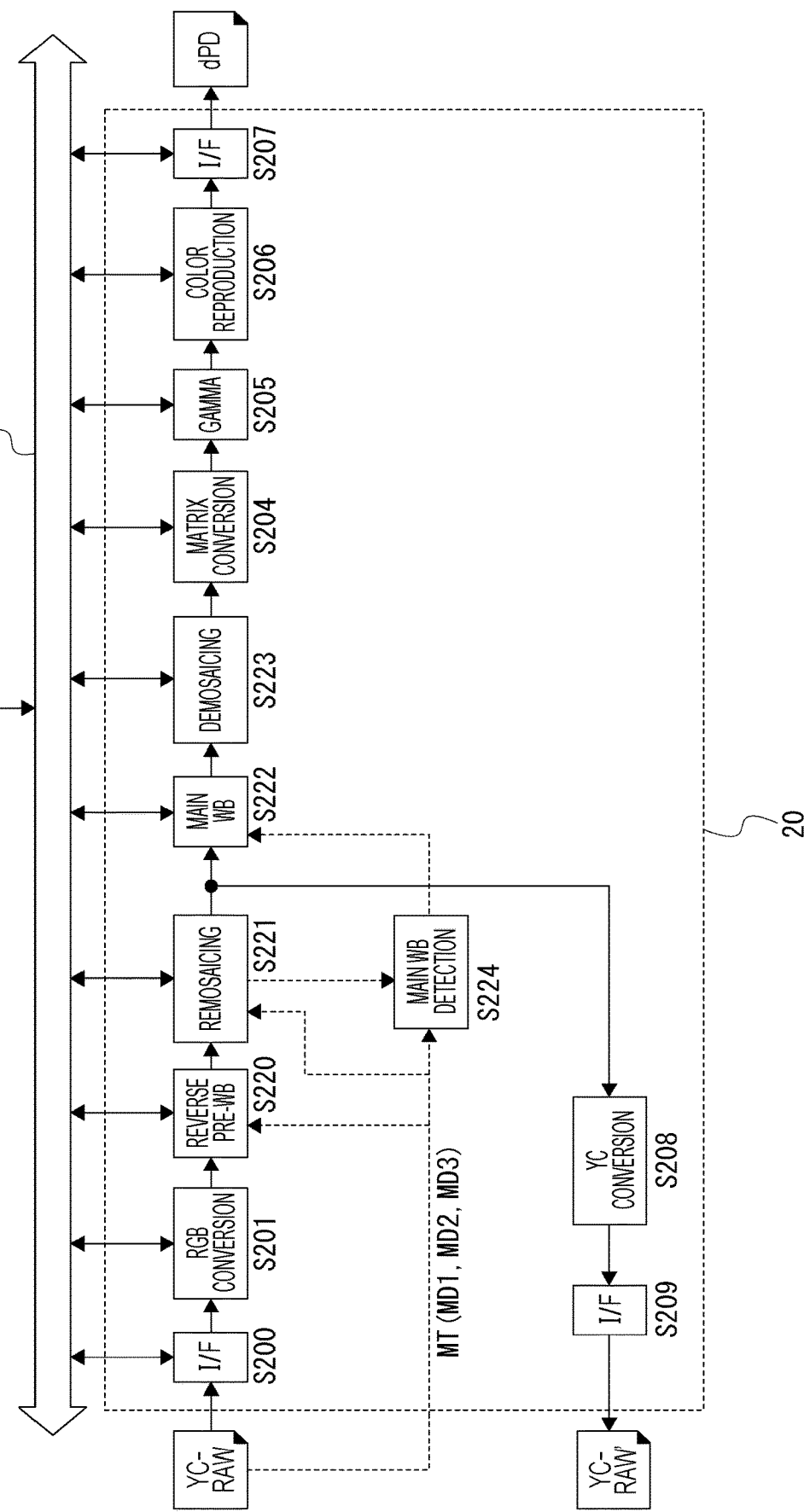
FIG. 14 is an explanatory diagram of raw data development processing according to a third embodiment.

FIG. 14 illustrates processing of the image processing unit 20 in a format similar to that in FIG. 10. The development processing for the YC-raw data in steps S200, S201, S220, S221, S222, S223, S224, S204, S205, S206, and S207 is similar to that in FIG. 10.

Here, the image data subjected to the remosaicing in step S221 is raw-format data in the original image sensor output format in which the color shift caused by the pre-WB processing and the demosaicing in the YC-raw data imaging processing has been corrected.

In step S208, the image processing unit 20 performs YC conversion processing on such data in the image sensor output format subjected to the color shift correction, and converts the data into data in the YCbCr format, that is, YC-raw data. This is referred to as "YC-raw' data" to be distinguished from the YC-raw data to be developed.

The generated YC-raw' data is output in interface processing in step S209. The control unit 100 records the YC-raw' data on the recording medium, for example. In the case of the imaging device 1, the YC-raw' data is recorded onto the recording medium in the recording control unit 14. In the case of the information processing device 70, the YC-raw' data is recorded onto the recording medium in the recording control unit 79.

At this time, the recording control unit 14 (or 74) causes the YC-raw' data to be overwritten and recorded onto the recording medium from which the YC-raw data to be developed has been read.

That is, the original YC-raw data to be developed in which the influence of the color shift should remain is overwritten with the YC-raw' data in which the influence of the color shift has been eliminated. This makes it unnecessary for the YC-raw data stored in the recording medium (=YC-raw' data) to be corrected for its color shift in the subsequent development processing. Therefore, it is useful processing when the reuse of the YC-raw data in the future is considered.

Note that, instead of overwriting the YC-raw' data onto the original YC-raw data, the YC-raw' data may be recorded onto the recording medium so as to coexist with the original YC-raw data as color shift corrected data, different from the original YC-raw data.

Furthermore, although the YC-raw' data is recorded in the example of FIG. 14, the image data subjected to the remosaicing in step S221, that is, the raw-format data in the original image sensor output format, may be recorded onto the recording medium so as to overwrite the original YC-raw data. Alternatively, the raw-format data in the original image sensor output format may be recorded onto the recording medium so as to co-exist with the original YC-raw data.

Furthermore, although FIG. 14 illustrates an example in which the image processing unit 20 also outputs the developed image dPD by performing the development processing in steps S222, S223, and S204 to S207, the image processing unit 20 may not generate or output the developed image dPD but may only perform output for generation and recording of the YC-raw' data or the raw format in the image sensor output format.

8. Fourth Embodiment: Processing with Color Shift Correction Execution Determination So far, it has been described that the reverse pre-WB processing and the remosaicing are performed as the color shift correction processing during the development processing for the YC-raw data, and then the main WB processing and the demosaicing are performed.

However, adding the color shift correction processing each time of the development processing for the YC-raw data increases the amount of calculation of the image processing unit 20, and the processing load may increase. In addition, the color shift correction processing may not always be necessary. Therefore, an example in which the development processing including the color shift correction processing is performed according to the situation will be described as a fourth embodiment. Furthermore, in the description, it is also explained that the control unit 100 automatically determines the necessity for the color shift correction processing and that the user can specify whether or not to execute the color shift correction processing via a user interface (UI).

Note that there are two possible ways for the user to specify whether or not to perform the development processing including the color shift correction processing: one through a UI during imaging and the other through a UI during development, for example.

During imaging, for example, the specification is performed by the user through a menu operation, and the specification information is made to be included in the metadata MT associated with the YC-raw data, so that the control unit 100 can confirm the specification content during development.

Furthermore, during development, the control unit 100 can cause specification information to be selected through a menu operation. Also, it is conceivable to set a UI with which, when the control unit 100 determines the necessity for the color shift correction processing in an individual image and determines the processing is necessary, the control unit 100 causes the user to select whether or not to execute the processing through the UI.

Figure 15:
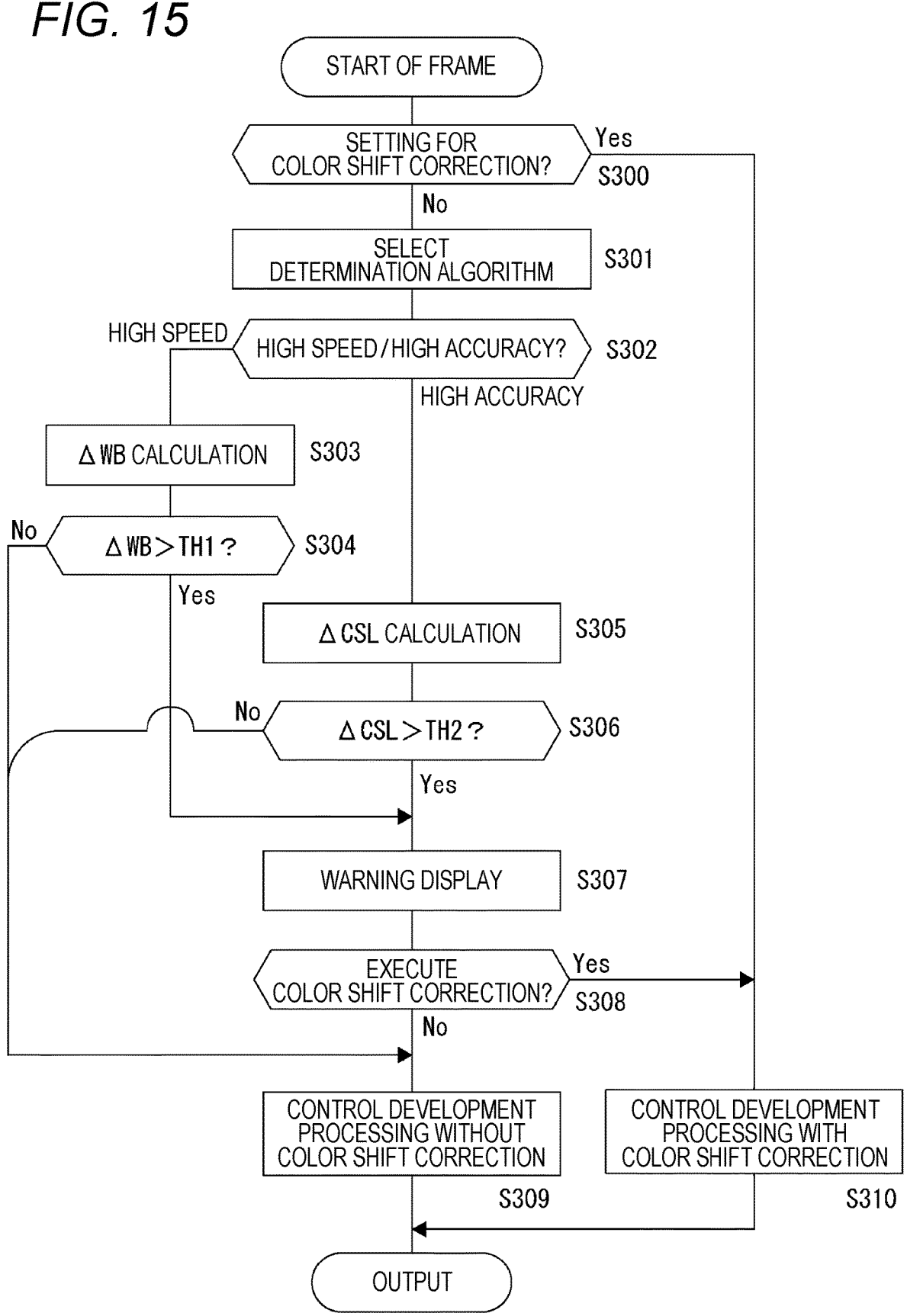
FIG. 15 is a flowchart of determination processing according to a fourth embodiment.

FIG. 15 illustrates a processing example of the control unit 100 during development processing. FIG. 15 illustrates a processing example for one frame of YC-raw data.

When one frame of YC-raw data is to be subjected to the development processing in the image processing unit 20, the control unit 100 determines in step S300 whether or not the YC-raw data has been set for color shift correction. For example, for a setting during imaging, the metadata MT is confirmed. In addition, a setting by a user operation during development may be confirmed.

Figure 16:
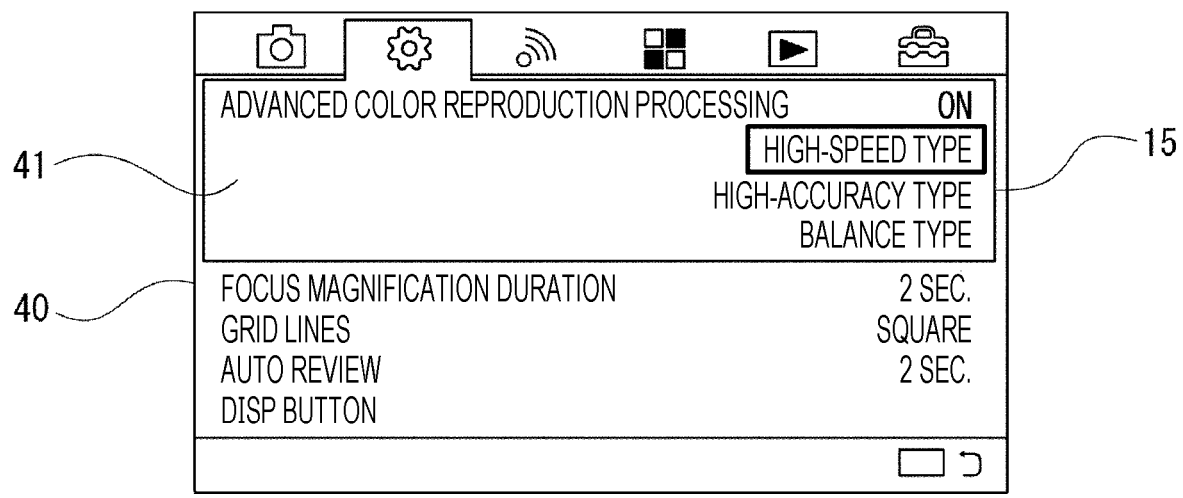
FIG. 16 is an explanatory diagram of a user setting screen according to the embodiment.

The user can set whether or not to perform the color shift correction processing through a UI using a menu screen 40 as illustrated in FIG. 16, for example. FIG. 16 illustrates an example of a menu screen displayed on the display unit 15 in the imaging device 1. A menu screen on which similar settings can be made in a form suitable for the screen may naturally be displayed on the display unit 77 in the information processing device 70.

Then, for example, a setting area 41 for "advanced color reproduction processing" is prepared on the menu screen 40, and the user can specify various settings.

The advanced color reproduction processing is processing that includes the color shift correction processing described above and increases the accuracy of color reproduction during imaging. When the advanced color reproduction processing is set to "ON", a setting is made to perform the development processing including the color shift correction processing, described with reference to FIG. 10 and the like. When the advanced color reproduction processing is set to "OFF", a setting is made for the development processing in which the color shift correction processing is not performed (the development processing in which the remosaicing is not performed), described with reference to FIG. 8.

In addition, any one of a "high-speed type", a "high-accuracy type", and a "balance type" can be selected and set with respect to the determination processing as to whether or not to perform the advanced color reproduction processing. For example, FIG. 16 schematically illustrates a state where the "high-speed type" has been set.

The high-speed type is a mode in which determination processing is performed using an algorithm that enables relatively high-speed execution, and the high-accuracy type is a mode in which determination processing is performed using an algorithm for relatively high accuracy. Specific examples of the respective types will be described later. The balance type is a mode in which high speed and high accuracy are automatically used according to image characteristics and the like.

In step S300 of FIG. 15, the control unit 100 confirms the content set by the user operating such menu screen 40 during imaging or development.

In the case of detecting that the advanced color reproduction processing is "ON" from the metadata MT for the current frame or in the case of detecting that the user has set the advanced color reproduction processing to "ON" during the current development processing, the control unit 100 proceeds from step S300 to step S310, and instructs the image processing unit 20 to perform the development processing including the color shift correction processing. As a result, the developed image dPD subjected to the color shift correction is obtained by the processing described above with reference to FIGS. 10, 12, 14, and the like.

For example, by setting the advanced color reproduction processing to "ON", the user can avoid the influence of the color shift caused by the pre-WB processing and the demosaicing from being left at all times, and can expect the high image quality effect of the developed image dPD. However, since the number of processing steps increases accordingly, the processing time may increase.

In a case where it is desired to reduce the processing time for the development processing, the advanced color reproduction processing is set to "OFF". In that case, the necessity for the color shift correction processing is determined by the determination processing, and the development processing including the color shift correction processing is executed as necessary.

In a case where the advanced color reproduction processing is "OFF" in the setting based on the user operation during imaging or development, the control unit 100 proceeds from step S300 to step S301 and starts the determination processing to determine the necessity for the color shift correction processing.

In step S301, the control unit 100 selects a determination algorithm. For example, the high-speed type or the high-accuracy type is selected. In this case, it is conceivable to perform the selection according to the user setting using the menu screen 40 in FIG. 16.

In a case where the high-speed type has been set, the high-speed algorithm is selected. In a case where the high-accuracy type has been set, the high-accuracy algorithm is selected. In a case where the balance type has been set, either the high-speed type or the high-accuracy algorithm is selected according to the situation. For example, in a case where one frame of YC-raw data as a still image is set as a development processing target, the high-accuracy type may be used, and in a case where a plurality of frames of YC-raw data as a moving image is set as a development processing target, the high-speed type may be used.

In step S302, the control unit 100 branches the processing depending on whether the selected algorithm is the high-speed type or the high-accuracy type. In a case where the high-speed type is selected, the control unit 100 proceeds to step S303.

An example of the high-speed algorithm will be described.

First, the WB value of the main WB processing is calculated based on the raw data input during development processing. Note that, at this time, the WB value of the main WB processing can be calculated using the light source information MD3 when the metadata MT includes the light source information MD3. Furthermore, in a case where the developing target is a plurality of frames of YC-raw data from a continuous-shooting or moving image, by applying the WB average value of several past frames to the current frame, it is possible to expect the saving of the WB detection value calculation time and further improvement in WB stability.

Once the WB value of the main WB processing is obtained, a difference ΔWB in WB value between the pre-WB and the main WB is obtained. It is determined whether or not the difference is larger than a threshold value TH1.

Specifically, the difference is obtained by: ΔWB=(WB value of pre-WB processing)−(WB value of main WB processing). Then, in a case where ΔWB>TH1, it is determined that the possibility of a color shift is high. On the other hand, in a case where ΔWB≤TH1, it is determined that the possibility of a color shift is low.

Note that it is conceivable to basically set the threshold value TH1 using a value that is several percent or less of the levels of the R and B gains from the pre-WB as a guide, but it is desirable to adjust the threshold value TH1 according to the actual image characteristics.

The above processing is the determination processing performed using the high-speed algorithm in steps S303 and S304.

When it is determined in step S304 that ΔWB>TH1 is not satisfied, the control unit 100 determines that the color shift correction is unnecessary, proceeds to step S309, and instructs the image processing unit 20 to perform the development processing not including the color shift correction processing as illustrated in FIG. 8.

Figure 17:
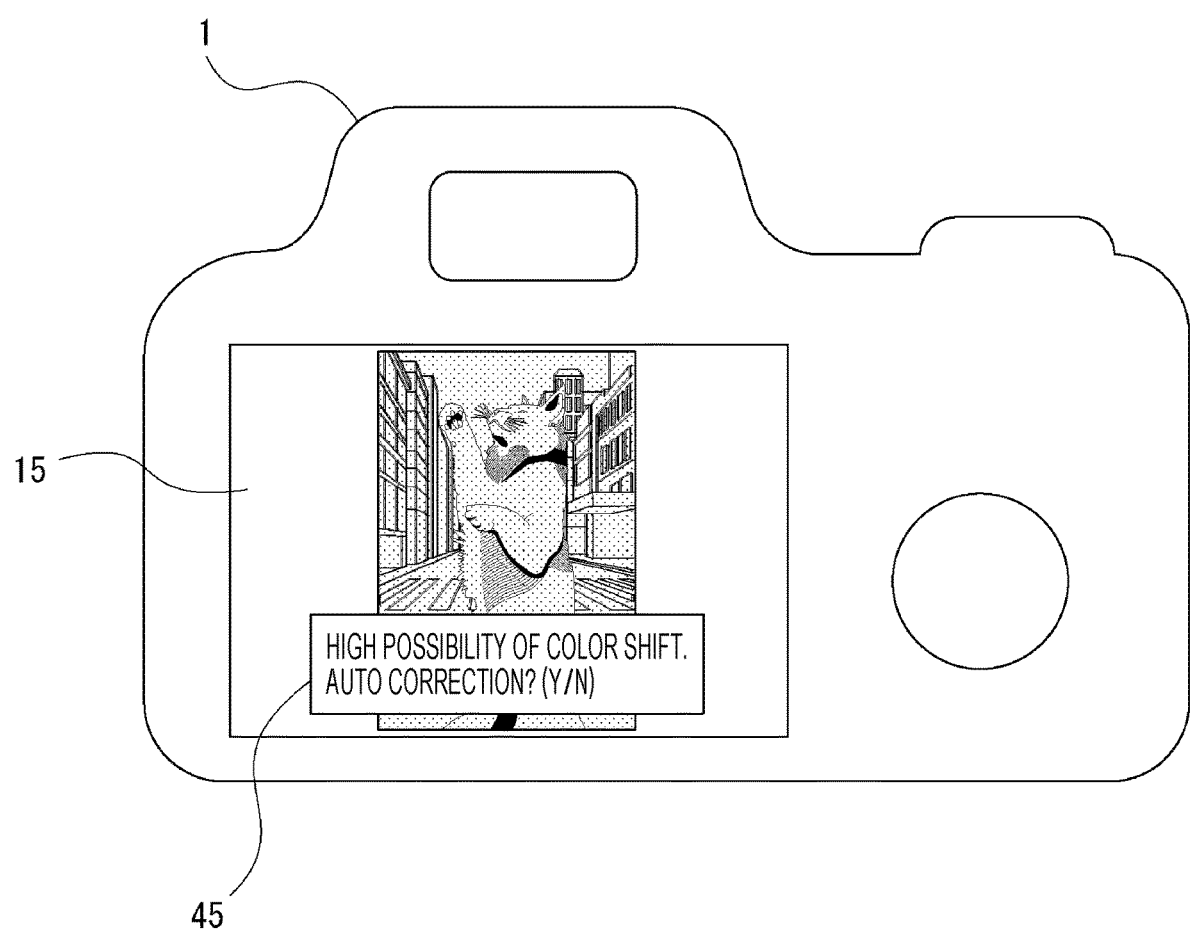
FIG. 17 is an explanatory diagram of a warning display example according to the embodiment.

When it is determined in step S304 that ΔWB>TH1 is satisfied, the control unit 100 proceeds to step S307 and performs warning display control. For example, in the case of the imaging device 1, a warning display 45 as illustrated in FIG. 17 is executed on the display unit 15. For example, a UI is configured to notify the user of the high possibility of generating an image with a color shift if the development processing is performed as is, and to cause the user to select whether or not to apply the correction processing.

In the case of the information processing device 70, a warning display having similar content is executed on the display unit 77.

In response to this, the control unit 100 waits for a user operation, and in a case where the user instructs the application of the color shift correction processing, the control unit 100 proceeds from step S308 to step S310, and instructs the image processing unit 20 to perform the development processing including the color shift correction processing. In a case where the user instructs against applying the color shift correction processing, the control unit 100 proceeds from step S308 to step S309 and instructs the image processing unit 20 to perform the development processing not including the color shift correction processing.

In a case where the high-accuracy algorithm is selected by the selection of the determination algorithm in step S301, the control unit 100 proceeds from step S302 to step S305 and performs the determination processing using the high-accuracy algorithm.

In the high-accuracy algorithm, for example, the signal level after the reverse pre-WB is observed, and in a case where the signal level is changed significantly due to the difference ΔWB (the difference in WB value between the pre-WB and the main WB), it is determined that the color shift of the corresponding pixel has occurred. Specifically, the following color shift parameter CSL (abbreviation for Color Shift Level) is defined, and the determination is made based on the value of the color shift parameter CSL.

$$\Delta CSL = \Delta WB \times \text{MAX}(RGB\_i)$$

"RGB_i" is an RGB signal value after reverse pre-WB in a certain block, and MAX(RGB_i) is the maximum value among the RGB signal values.

Then, using a threshold value TH2, it is determined that the color shift possibility is high in the case of ΔCSL>TH2, and the color shift possibility is low in the case of ΔCSL≤TH2.

Note that the threshold value TH2 is basically set using a value that is several percent of the signal level in the current block as a guide, but it is desirable to adjust the threshold value TH2 according to actual image characteristics.

The above processing is the determination processing in the high-accuracy algorithm in steps S305 and S306.

When it is determined in step S306 that ΔCSL>TH2 is not satisfied, the control unit 100 determines that the color shift correction is unnecessary, proceeds to step S309, and instructs the image processing unit 20 to perform the development processing not including the color shift correction processing as illustrated in FIG. 8.

When it is determined in step S306 that ΔCSL>TH2 is satisfied, the control unit 100 proceeds to step S307 and performs warning display control.

Figure 18:
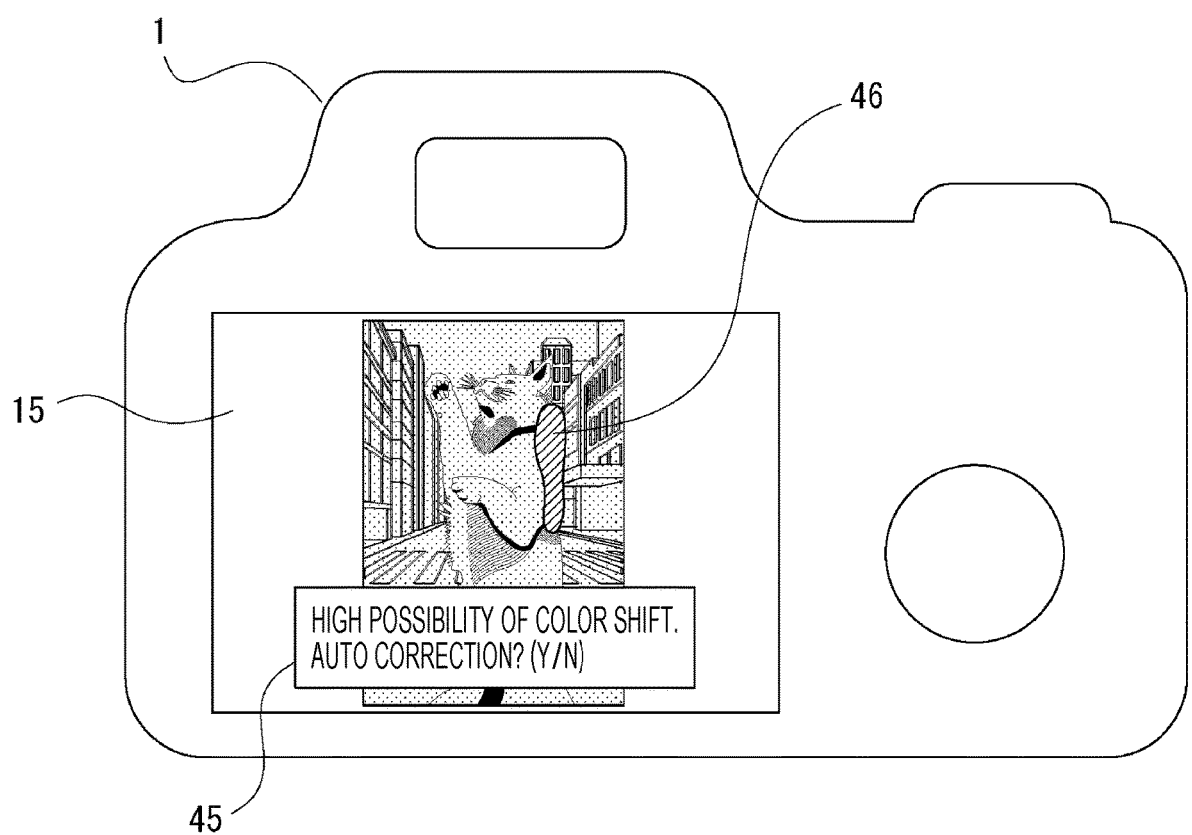
FIG. 18 is an explanatory diagram of a display example of a color shift portion according to the embodiment.

For example, in the case of the imaging device 1, the warning display 45 as illustrated in FIG. 18 is executed on the display unit 15. For example, a UI is configured to notify the user of the high possibility of generating an image with a color shift if the development processing is performed as is, and to cause the user to select whether or not to apply the correction processing. Furthermore, in a case where the high-accuracy algorithm is applied, a color shift area display 46 can be executed because the color shift determination is performed for each block within the frame. For example, a portion corresponding to a block in which a color shift has occurred is presented to the user as a zebra display or the like. Of course, the zebra display is an example, and it is only required to clearly indicate an area in which a color shift occurs as highlight display, discoloration display, frame display, or the like.

Figure 19:
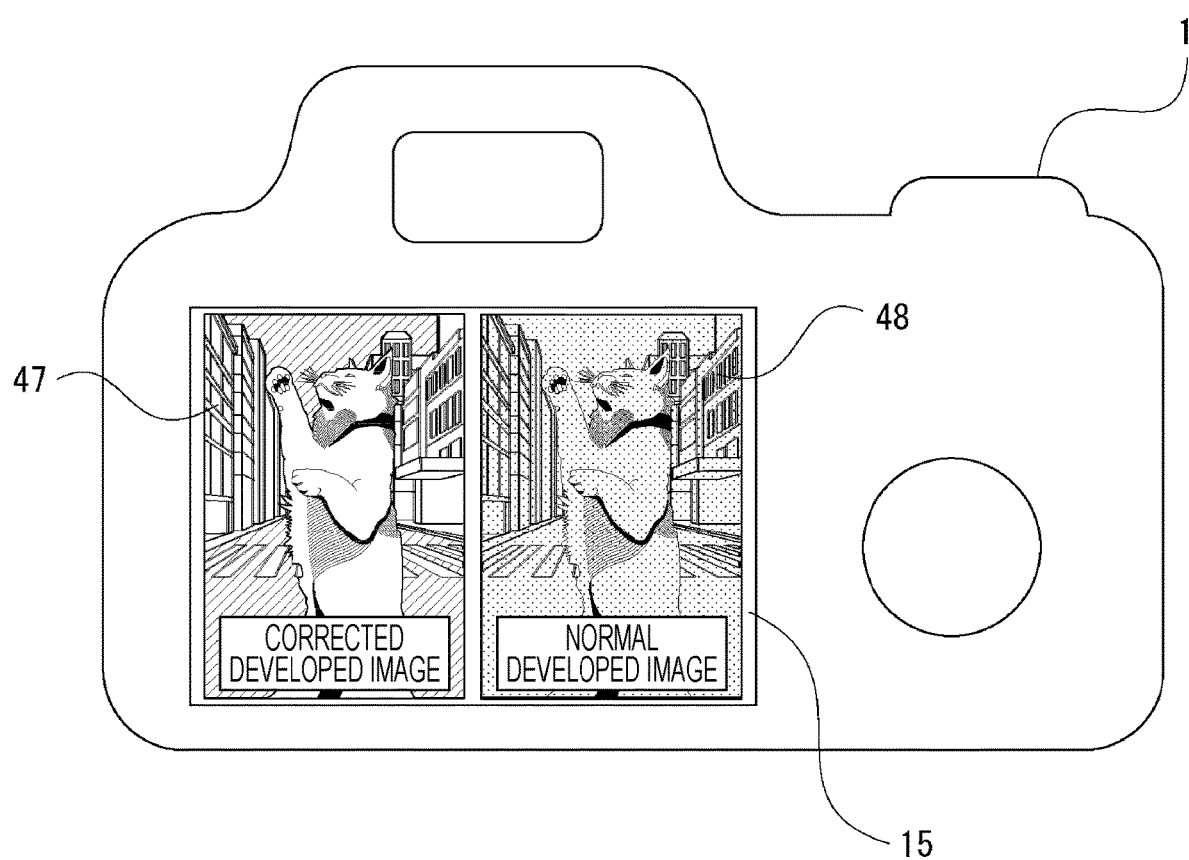
FIG. 19 is an explanatory diagram of an example of presentation before and after color shift correction according to the embodiment.

Furthermore, at this stage, the control unit 100 may cause the image processing unit 20 to execute processing to which the color shift correction processing is added, and control presentation of images before and after the color shift is resolved to the user, side by side on the same screen, using a color shift corrected developed image 47 and a normal developed image 48, as illustrated in FIG. 19.

For example, the screens of FIGS. 18 and 19 may be switchable by a user operation, or the control unit 100 may automatically switch the display.

This facilitates the user to select the development processing method.

After the warning display 45 is executed, the control unit 100 waits for a user operation, and in a case where the user instructs the application of the color shift correction processing, the control unit 100 proceeds from step S308 to step S310, and instructs the image processing unit 20 to perform the development processing including the color shift correction processing. In a case where the user instructs against applying the color shift correction processing, the control unit 100 proceeds from step S308 to step S309 and instructs the image processing unit 20 to perform the development processing not including the color shift correction processing.

As described above, in a case where the determination processing to determine the necessity for the color shift correction processing is performed in FIG. 15, an algorithm of the determination processing is selected, and the warning display 45 or the like is executed as necessary. In other words, even when the advanced color reproduction processing is not set to ON, and the color shift correction processing is not always applied on the menu screen 40, the user can optionally execute development processing with the color shift correction processing applied in a case where the color shift correction processing is determined to be necessary.

Note that an example in which the warning display 45 is performed has been described, but other examples are also conceivable. For example, in a case where it is determined that the color shift correction is necessary in the determination processing, detailed information of a color shift, such as the coordinate information and ΔCSL value for the area where an unnatural color shift has occurred, may be recorded as the metadata associated with the developed image dPD, and it may be possible to select whether or not to perform the color shift correction processing later.

Here, the selection of the determination algorithm in step S301 will be described. In the above, the specification of the high-speed or the high-accuracy algorithm can be considered in addition to the specification by the user through the menu operation (emphasis on high speed, emphasis on high accuracy, or balance type).

For example, a mechanism is assumed in which the control unit 100 automatically selects a determination algorithm according to a camera setting. Note that the following automatic selection method can also be applied to selection in a case where the balance type has been specified on the menu screen 40.

Conceivable examples of determination algorithm selection include the following:
- selection based on a fast continuous-shooting speed
- selection based on whether or not face detection has been performed
- selection based on a power saving mode in the imaging device 1
- and other selections.

For example, the faster the fast continuous-shooting speed, the lower the accuracy of the pre-WB processing. This is because a shorter time for calculating the WB value makes it harder to maintain the accuracy. Hence the faster the fast continuous-shooting speed, the larger the color shift tends to be.

Therefore, an example is conceivable in which the fast continuous-shooting speed is divided using a certain threshold speed, the high-speed algorithm is applied in a case where the speed is faster than the threshold speed, and the high-accuracy algorithm is applied in a case where the speed is equal to or lower than the threshold speed. This is because a clear difference is easily detected as the difference ΔWB in an image captured at a fast continuous-shooting speed where accuracy is hard to maintain, and thus, accurate determination can be expected even with the high-speed algorithm.

For a similar reason, it is also conceivable to apply the high-speed algorithm during development of YC-raw data obtained by continuous-shooting imaging or capturing moving images, and apply the high-accuracy algorithm during development of YC-raw data obtained by single-shooting imaging.

The selection based on a fast continuous-shooting speed is performed for the following reason.

Comparing a case where the face is detected in the image and a case where the face is not included in the image, it is easier to recognize the influence of the color shift when the face is present. Therefore, it is conceivable to apply the high-accuracy algorithm for a frame in which the face is detected and the high-speed algorithm for a frame in which the face is not detected.

The selection based on a power saving mode in the imaging device 1 is performed for the following reason.

In a case where the remaining battery level is low or in a case where the power saving mode has been turned on in the imaging device 1, the amount of calculation is preferable small. Therefore, it is conceivable to apply the high-speed algorithm with a small amount of calculation in a case where the remaining battery level is low or in a case where the power saving mode has been turned on, and apply the high-accuracy algorithm in situations where those conditions do not occur.

Meanwhile, in a case where the development processing including the color shift correction processing described in the first embodiment and the like is performed, the high image quality effect can be expected, but the development processing time may increase. In particular, in a case where the processing always proceeds from step S300 to step S310 in the processing of FIG. 15, the processing time tends to be long.

Figure 20:
FIG. 20 is an explanatory diagram of image division processing according to the embodiment.

Thus, it is also conceivable to reduce the processing time. For example, it is possible to reduce the processing time by dividing the image into blocks and performing pipeline processing as illustrated in FIG. 20.

Furthermore, the following approach is also possible: during development, a developed image dPD is generated by performing the processing not including the color shift correction processing illustrated in FIG. 8. While the generated developed image dPD is displayed, a developed image dPD is generated by performing the processing including the color shift correction processing as illustrated in FIG. 10 as background processing. The developed image dPD is then replaced sequentially. In this case, it is possible to make the processing delay inconspicuous to the user.

Figure 21:
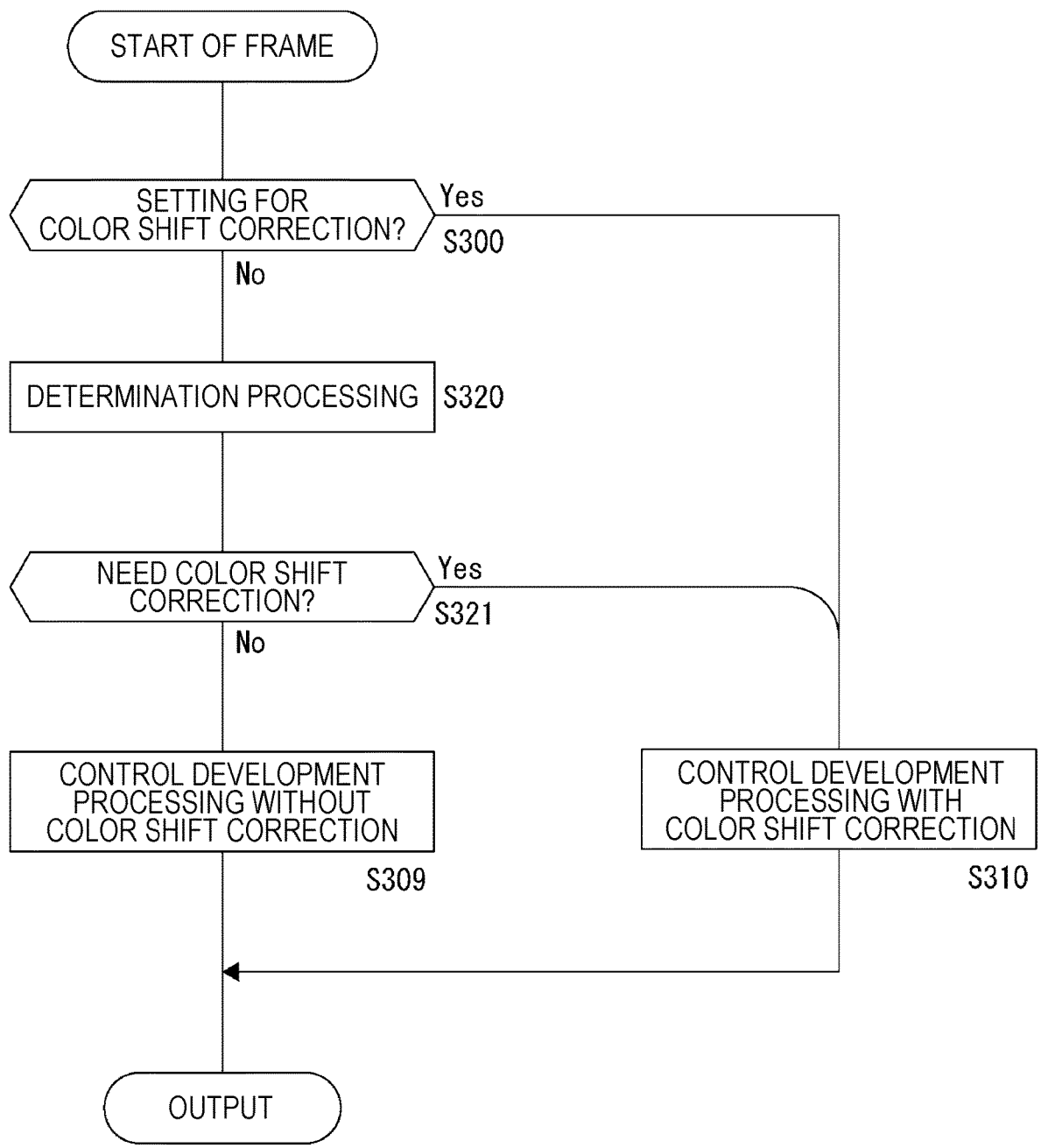
FIG. 21 is a flowchart of another determination processing according to the fourth embodiment.

As a processing example of the control unit 100 in the case of performing the determination processing, a processing example as illustrated in FIG. 21 is also conceivable.

Steps S300, S309, and S310 in FIG. 21 are similar to those in FIG. 15.

For example, in a case where the advanced color reproduction processing has been set to "ON" by the menu setting, the development processing including the color shift correction processing described with reference to FIG. 10 and the like is performed in step S310. In a case where the advanced color reproduction processing is "OFF", the color shift determination processing is performed in step S320. In this case, the determination processing is performed using a fixed determination algorithm. For example, in step S320, determination processing is always performed using the high-speed algorithm. The determination processing may always be performed using the high-accuracy algorithm.

Then, in a case where it is determined that the possibility of the color shift is high, the control unit 100 proceeds from step S321 to step S310 and instructs the image processing unit 20 to perform the development processing including the color shift correction processing. In a case where it is determined that the possibility of the color shift is low, the control unit 100 proceeds from step S321 to step S309 and instructs the image processing unit 20 to perform the development processing not including the color shift correction processing.

As described above, the example of FIG. 21 is an example using the fixed determination algorithm. Also, this is an example of selecting a development processing method without waiting for user selection according to the determination processing.

Furthermore, as the determination processing, it is possible to perform determination using the metadata MT, as well as determination based on signals obtained inside the image processing unit 20 and the control unit 100, like the determination algorithm described above.

For example, the light source estimated by the pre-WB processing is determined from the pre-WB information MD1 related to the pre-WB processing when the YC-raw data imaging processing is performed in the imaging device 1. Alternatively, the light source determination information is included in the pre-WB information MD1. On the other hand, there is the light source information MD3 estimated from the detection value of the illuminance sensor in the sensor unit 23.

In that case, the possibility of a color shift can be determined on the basis of whether or not the light source determination information based on the pre-WB information MD1 and the light source information MD3 match.

Figure 22:
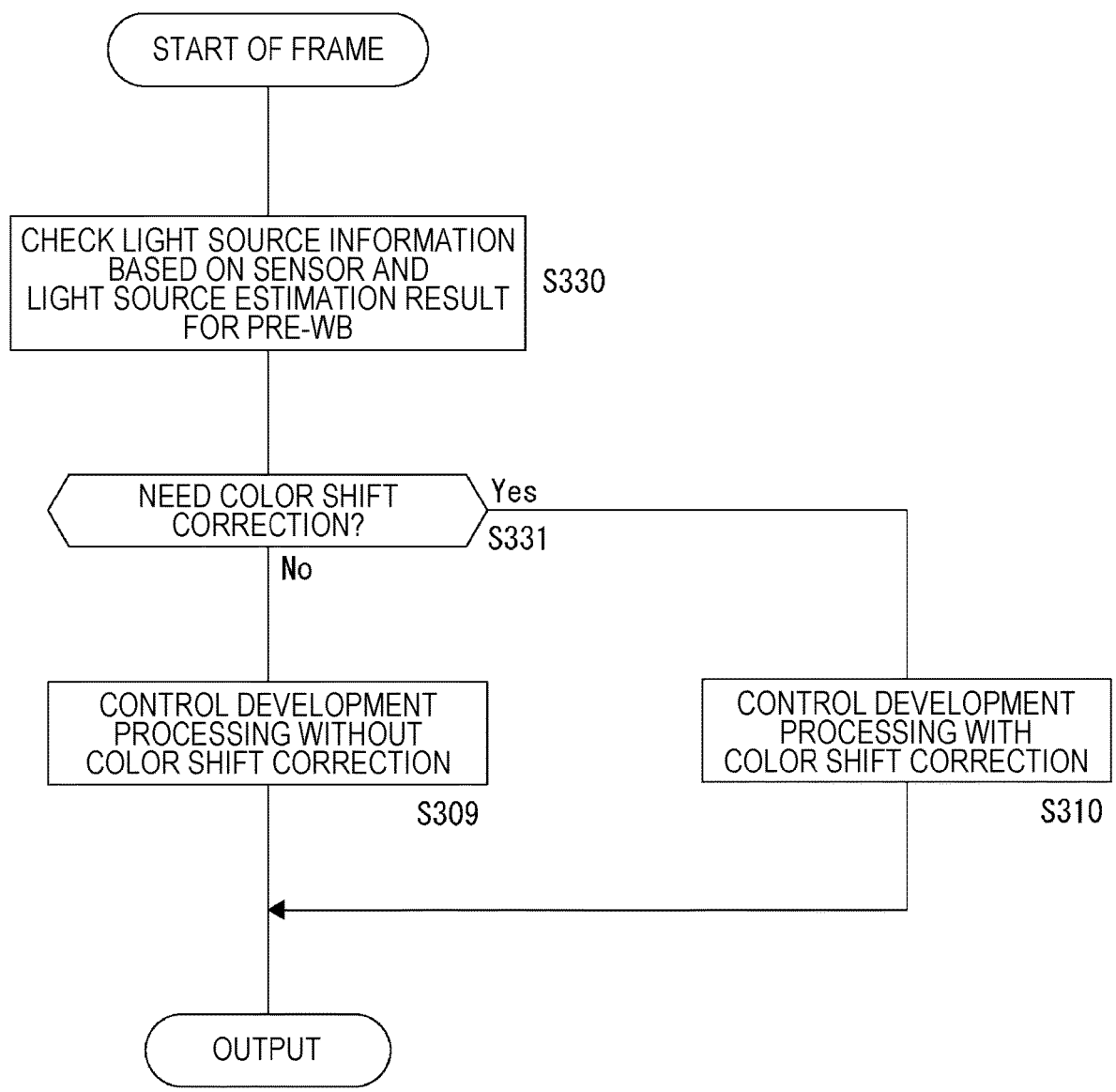
FIG. 22 is a flowchart of still another determination processing of the fourth embodiment.

The processing example of FIG. 22 is an example of using such determination processing.

In step S330, the control unit 100 determines whether or not the light source determination information based on the pre-WB information MD1 matches the light source information MD3.

Then, in the case of a non-match, the control unit 100 determines that the color shift correction is necessary because there is a high possibility of a color shift, proceeds from step S331 to step S310, and instructs the image processing unit 20 to perform the development processing including the color shift correction processing. In a case where the result of step S330 is a match, the possibility of a color shift is low and the color shift correction processing is unnecessary, and the control unit 100 proceeds from step S321 to step S309 and instructs the image processing unit 20 to perform the development processing not including the color shift correction processing.

This can facilitate the switching of the development processing method, that is, whether or not to add the color shift correction processing.

9. Summary and Modification Examples

In the above embodiments, the following effects can be obtained.

The image processing device according to each of the embodiments, that is, the image processing unit 20 (or the imaging device 1 or the information processing device 70 including the image processing unit 20) performs development processing on YC-raw data, which is image data obtained by performing pre-WB processing, demosaicing, and YC conversion processing on an image sensor output, such as image data in an RGB format. In that case, conversion processing to convert the YC-raw data into an image sensor output format (e.g., RGB format) is performed, and further, reverse pre-WB processing with respect to the pre-WB processing and remosaicing to restore the state prior to the demosaicing are performed.

By performing color shift correction processing including the reverse pre-WB processing and the remosaicing on the YC-raw data, the color shift caused by the pre-WB processing and the demosaicing during the generation of the YC-raw data can be eliminated. Then, by performing development processing on the YC-raw data, the occurrence of a color shift can be avoided during development. This can achieve improvement in the image quality of the developed image dPD developed from the YC-raw data. This also promotes the effective use of the YC-raw data by capitalizing on the advantages of the YC-raw data, such as its smaller data size than that of RGB-raw data, low image quality deterioration even after resizing, and suitability for high-speed recording.

Note that, although the image data in the RGB format has been used as an example of the image data in the image sensor output format, the image data in the image sensor output format may be image data in a format using Cy, Ye, G, and Mg based on the complementary color filter described with reference to FIG. 4 or image data in a WRGB format based on a W-RGB filter.

In the first, second, and third embodiments, an example has been described in which the image processing unit 20 performs the main WB processing and the demosaicing on the image data after the remosaicing (cf. FIGS. 10, 12, and 14).

The color shift included in the original YC-raw data is eliminated by the reverse pre-WB processing and the remosaicing, and then the main WB processing and the demosaicing are performed, whereby it is possible to obtain RGB-plane image data without a color shift from the state during imaging. From this state, matrix conversion processing, gamma processing, color reproduction processing, and the like are applied to perform development, thus making it possible to obtain a high-quality developed image dPD in which no color shift has occurred can be obtained.

In the second embodiment, an example has been described in which the image processing unit 20 performs development processing on the image data after the remosaicing, a plurality of times with different parameter settings to generate a plurality of developed images dPD.

For example, for the main WB processing, the matrix conversion processing, the gamma processing, and the color reproduction processing, a plurality of developed images dPD1, dPD2, dPD3, . . . is generated using different parameters. This makes it possible to provide the user with developed images to which various types of image enhancement have been applied. The user can select an image according to his or her preference as well as an image that is simply true to the color state during imaging.

In the second embodiment, an example has been described in which the image processing unit 20 generates the difference information DD compared to the developed image used as a reference for some of the plurality of developed images dPD.

For example, in a case where a plurality of developed images dPD1, dPD2, dPD3 is generated, difference information DD2 between the developed image dPD2 and the reference developed image dPD1 and difference information DD3 between the developed image dPD3 and the reference developed image dPD1 are generated. By recording the difference information DD2, DD3 onto the recording medium, the necessary recording capacity can be significantly reduced compared to a case where the developed images dPD2, dPD3 are recorded as they are.

In the fourth embodiment, an example has been described in which the control unit 100 performs determination processing to determine the necessity for color shift correction for the YC-raw data, and causes the image processing unit 20 to execute the remosaicing according to the determination result.

For example, a large color shift does not always occur in the YC-raw data to be developed. When the control unit 100 performs the determination processing and determines that the color shift is large to some extent, the image processing unit 20 performs development processing with color shift correction, whereby a high-quality developed image dPD is obtained. Conversely, in a case where there are not many color shifts, it is possible to eliminate the need for processing such as remosaicing, which is suitable for reducing the processing load and speeding up the development processing.

In the fourth embodiment, an example has been described in which, as the determination processing, the control unit 100 determines the necessity for color shift correction, using the difference value (ΔWB) between the WB value obtained for the YC-raw data and the WB value used in the pre-WB processing for the YC-raw data. In other words, this is determination processing using the high-speed algorithm.

This enables easy detection of the color shift of the image data. In particular, the processing is internal signal processing, so that real-time detection can be performed without delay by comparing signal differences immediately before and immediately after the processing.

In the fourth embodiment, an example has been described in which, as the determination processing, the control unit 100 determines the necessity for color shift correction on the basis of the change amount ΔCSL of the signal level after the reverse pre-WB processing for the YC-raw data. In other words, this is determination processing using the high-accuracy algorithm.

This is also internal signal processing, so that the determination can be performed relatively quickly. In addition, by performing the determination on a pixel-by-pixel/block-by-block basis, it is possible to accurately specify the area where the color shift has occurred.

In the processing example of FIG. 22 in the fourth embodiment, an example has been described in which, as the determination processing, the control unit 100 determines the necessity for color shift correction, using the information based on the WB value used in the pre-WB processing for the YC-raw data and the light source information detected during imaging.

In the case of the imaging device 1 including the sensor from which the light source information MD3 is obtained, or in the case of the information processing device 70 that has acquired YC-raw data in which the light source information MD3 is added to the metadata MT, the light source information MD3 can be used. In that case, the presence or absence of a color shift can be estimated by comparing the light source information MD3 with the light source estimated by the pre-WB processing. In this case, the determination processing can be performed extremely simply and at high speed.

In the processing example of FIG. 15 in the fourth embodiment, an example has been described in which the control unit 100 can select a plurality of processing methods as the determination processing and performs the determination processing by the selected processing method.

For example, as the processing method for the determination processing, the high-speed algorithm that can be executed at a relatively high speed, the high-accuracy algorithm with relatively high accuracy, and the like can be executed selectively. This makes it possible to perform determination processing suitable for the situation.

In the processing example of FIG. 15 in the fourth embodiment, an example has been described in which the control unit 100 selects the processing method for the determination processing on the basis of a user setting.

For example, the control unit 100 selects a determination method (algorithm) according to the setting of the high-speed type, the high-accuracy type, or the like made by the user in the menu setting or the like. This enables determination processing according to the purpose, use case, or the like of the user.

In the processing example of FIG. 15 in the fourth embodiment, an example has been described in which the control unit 100 automatically selects the processing method for the determination processing.

For example, the control unit 100 automatically selects a determination method (algorithm) such as the high-speed type or the high-accuracy type according to some trigger, a setting, an imaging situation, or the like. For example, the selection is made according to a fast continuous-shooting speed, the presence or absence of a face image, a battery situation, or the like. This enables determination processing suitable for an imaging operation, image content, a device situation, or the like.

In the processing example of FIG. 15 in the fourth embodiment, an example has been described in which the control unit 100 controls execution of warning in the case of detecting a color shift by the determination processing.

For example, in the case of detecting that a color shift has occurred as a result of the determination processing, the control unit 100 causes the warning display 45 or the color shift area display 46 to be executed (cf. FIGS. 17, 18, and 19). This enables the user to recognize that a color shift occurs.

In the processing example of FIG. 15 in the fourth embodiment, an example has been described in which the control unit 100 controls the image processing unit 20 to execute the remosaicing in response to a user operation performed according to the warning (cf. steps S308 and S310 in FIG. 15).

The user who has recognized the occurrence of the color shift due to the warning can select whether or not to perform the color shift correction in the development processing according to his or her purpose, preference, convenience, or the like.

In the first embodiment, an example has been described in which the image processing unit 20 performs the reverse pre-WB processing, using the pre-WB information MD1 in the metadata MT associated with the YC-raw data.

The addition of the pre-WB information MD1 as the metadata MT enables accurate execution of the reverse pre-WB processing that returns the pre-WB processing to the pre-processing.

In the first embodiment, an example has been described in which the image processing unit 20 performs the remosaicing, using the sensor array information MD2 in the metadata MT associated with the YC-raw data.

The addition of the sensor array information MD2 as the metadata MT enables accurate execution of the remosaicing.

In the first embodiment, an example has been described in which, in the development processing, the image processing unit 20 calculates the WB value of the main WB, using the light source information MD3 in the metadata MT associated with the YC-raw data to be developed, and performs the main WB processing.

The addition of the light source information as the metadata MT enables the main WB processing to be performed with a value corresponding to the light source during imaging.

The image processing device described in the third embodiment includes a recording control unit (14, 79) that records image data in an image sensor output format or YC-raw' data onto a recording medium, the image data having been obtained after conversion processing into the image sensor output format is performed on the YC-raw data, and reverse pre-WB processing with respect to the pre-WB processing and remosaicing to restore the state prior to the demosaicing are further applied, the YC-raw data having been obtained on the basis of the image data in the image sensor output format obtained after the remosaicing.

After the color shift correction processing is applied to the YC-raw data by the reverse pre-WB processing and the remosaicing, the YC-raw' data obtained by the YC conversion has no color shift caused by the pre-WB processing and the demosaicing as in the original YC-raw data. Therefore, by overwriting and recording the obtained YC-raw' data onto the original YC-raw data, the YC-raw' data can then be used as raw image data with which a high-quality image can be developed. The YC-raw' data may be recorded so as to co-exist with the original YC-raw data.

In addition, data in a state where the color shift correction processing has been performed on the YC-raw data by the reverse pre-WB processing and the remosaicing, that is, raw-format data in the original image sensor output format may be recorded onto the recording medium together with or by overwriting the original YC-raw data. The data in the original image sensor output format can also be used as raw image data capable of developing a high-quality image.

In addition, both the YC-raw' data and the data in the image sensor output format may be recorded onto the recording medium.

The imaging device 1 of the embodiment illustrated in FIG. 1 includes the imaging unit 12 that obtains captured image data using an image sensor 12*a*, and an image processing unit 20 that generates YC-raw data by performing pre-WB processing, demosaicing, and YC conversion processing on image data in the RGB format obtained by the imaging unit 12. In addition, the imaging device 1 includes the camera control unit 18 that performs processing to associate, with the YC-raw data, the sensor array information MD2 indicating the pixel array of the image sensor 12*a* as the metadata MT used in the remosaicing to restore the state prior to the demosaicing, and the pre-WB information MD1 including the parameters of the pre-WB processing as the metadata MT used in the reverse pre-WB processing with respect to the pre-WB processing (cf. FIGS. 6 and 7).

The association of the pre-WB information MD1 and the sensor array information MD2 as the metadata MT with the YC-raw data makes it possible to accurately perform the reverse pre-WB processing and the remosaicing with reference to these pieces of information, for example, during development processing or the like.

In addition, the imaging device 1 may include an illuminance sensor as a sensor capable of detecting light source information. An example has been described in which the camera control unit 18 performs processing in which the sensor array information MD2, the pre-WB information MD1, and the light source information MD3 generated on the basis of the detection value of the sensor are used as the metadata MT that is used in the development processing for the YC-raw data (cf. FIG. 7).

Also including the light source information MD3 as the metadata MT makes it possible to perform more accurate main WB processing with reference to this information in the main white balance processing during development processing.

The program related to the development processing according to the embodiment is a program for causing a CPU, a DSP, a GPU, a GPGPU, an AI processor, or the like, or a device including the CPU, the DSP, the GPU, the GPGPU, the AI processor, or the like, to execute the development processing as illustrated in FIGS. 10 and 12 described above.

That is, as the program of the embodiment, it is possible to assume a program that causes an arithmetic processing device functioning as an image processing device to perform conversion processing into the RGB format on YC-raw data that is image data obtained by performing pre-WB processing, demosaicing, and YC conversion processing on image data in the RGB format, and further perform reverse pre-WB processing with respect to the pre-WB processing and remosaicing to restore the state prior to the demosaicing.

In addition, the program according to the embodiment is a program that causes the arithmetic processing device to execute processing to generate YC-raw' data as illustrated in FIG. 14.

That is, as the program of the embodiment, it is possible to assume a program that causes the arithmetic processing device to execute processing of recording image data in an image sensor output format onto a recording medium, the image data having been obtained after conversion processing into the image sensor output format is performed on YC-raw data that is image data obtained by performing pre-WB processing, demosaicing, and a YC conversion processing on image data in the image sensor output format, and reverse pre-WB processing with respect to the pre-WB processing and remosaicing to restore the state prior to the demosaicing are further applied.

Alternatively, it is also possible to assume a program that causes the arithmetic processing device to execute processing of recording YC-raw data obtained on the basis of image data in the image sensor output format obtained after the remosaicing described above onto the recording medium.

By such programs, the image processing device referred to in the present disclosure can be achieved by various computer devices.

These programs can be recorded in advance in an HDD as a recording medium built in a device such as a computer device, a ROM in a microcomputer having a CPU, or the like.

Alternatively, the program can be temporarily or permanently housed (recorded) in a removable recording medium such as a flexible disk, a compact disc read-only memory (CD-ROM), a magneto optical (MO) disk, a digital versatile disc (DVD), a Blu-ray disc (registered trademark), a magnetic disk, a semiconductor memory, a memory card, or the like. Such a removable recording medium can be provided as what is called package software.

Furthermore, such a program can be installed from the removable recording medium into a personal computer or the like, or can be downloaded from a download site via a network such as a local area network (LAN) or the Internet.

Moreover, such a program is suitable for providing the image processing device of the present disclosure in a wide range. For example, by downloading the program to a mobile terminal device such as a smartphone or a tablet, a mobile phone, a personal computer, a game device, a video device, a personal digital assistant (PDA), or the like, these devices can be caused to function as the image processing device of the present disclosure.

The computer device functioning as the image processing device of the present disclosure using such a program can also be achieved as a cloud server. For example, each processing described in the embodiment can be executed by cloud computing in cooperation with the imaging device 1.

Note that effects described herein are merely examples and are not limited, and other effects may be provided.

Note that the present technology may also have the following configurations.

(1)

An image processing device including
an image processing unit that performs conversion processing, into an image sensor output format, on YC-raw data that is image data obtained by performing pre-white balance processing, demosaicing, and a YC conversion processing on image data in the image sensor output format, and further performs reverse pre-white balance processing with respect to the pre-white balance processing and remosaicing to restore a state prior to the demosaicing.

(2)

The image processing device according to (1) above,
in which the image processing unit performs white balance processing and demosaicing on the image data after the remosaicing.

(3)

The image processing device according to (1) or (2) above,
in which the image processing unit performs development processing on the image data after the remosaicing, a plurality of times with different parameter settings to generate a plurality of developed images.

(4)

The image processing device according to (3) above,
in which the image processing unit generates difference information compared to a developed image used as a reference, for some of the plurality of developed images.

(5)

The image processing device according to any one of (1) to (4) above,
in which a control unit that performs determination processing to determine necessity for color shift correction for YC-raw data and causes the image processing unit to execute the remosaicing in accordance with a determination result.

(6)

The image processing device according to (5) above,
in which, as the determination processing, the control unit determines necessity for color shift correction, using a difference value between a white balance value obtained for YC-raw data and a white balance value used in the pre-white balance processing for the YC-raw data.

(7)

The image processing device according to (5) or (6) above,
in which as the determination processing, the control unit determines necessity for color shift correction for YC-raw data on the basis of an amount of change in a signal level after the reverse pre-white balance processing.

(8)

The image processing device according to any one of (5) to (7) above,
in which as the determination processing, the control unit determines necessity for color shift correction, using information based on a white balance value used in the pre-white balance processing for YC-raw data and light source information detected during imaging.

(9)

The image processing device according to (5) to (8) above,
in which the control unit is capable of selecting a plurality of processing methods as the determination processing, and performs the determination processing by a processing method selected.

(10)

The image processing device according to (9) above,
in which the control unit selects the processing method for the determination processing on the basis of a user setting.

(11)

The image processing device according to (9) above,
in which the control unit automatically selects the processing method for the determination processing.

(12)

The image processing device according to any one of (5) to (11) above,
in which the control unit controls execution of warning in a case where the control unit determines by the determination processing that color shift correction is necessary.

(13)

The image processing device according to (12) above,
in which the control unit causes the image processing unit to execute the remosaicing in response to a user operation performed according to the warning.

(14)

The image processing device according to any one of (1) to (13) above,
in which the image processing unit performs the reverse pre-white balance processing, using pre-white balance information in metadata associated with YC-raw data.

(15)

The image processing device according to any one of (1) to (14) above,
in which the image processing unit performs the remosaicing, using sensor array information in metadata associated with YC-raw data.

(16)

The image processing device according to (2) above,
in which in the development processing, the image processing unit performs the white balance processing after the remosaicing, using light source information in metadata associated with YC-raw data to be developed.

(17)

An image processing device including
a recording control unit that records image data in an image sensor output format or YC-raw data onto a recording medium,
the image data having been obtained after conversion processing into the image sensor output format is performed on YC-raw data that is image data obtained by performing pre-white balance processing, demosaicing, and a YC conversion processing on image data in the image sensor output format, and reverse pre-white balance processing with respect to the pre-white balance processing and remosaicing to restore a state prior to the demosaicing are further applied,
the YC-raw data to be recorded, having been obtained on the basis of the image data in the image sensor output format obtained after the remosaicing.

(18)

An imaging device including:
an imaging unit that obtains captured image data using an image sensor;
an image processing unit that performs pre-white balance processing, demosaicing, and YC conversion processing on image data in an image sensor output format obtained by the imaging unit to generate YC-raw data; and a control unit that performs processing to associate, with YC-raw data, sensor array information indicating a pixel array of the image sensor as metadata used in remosaicing to restore a state prior to the demosaicing, and pre-white balance information including a parameter of the pre-white balance processing as metadata used in reverse pre-white balance processing with respect to the pre-white balance processing.

(19)

The image processing device according to (18) above, further including a sensor capable of detecting light source information, in which the control unit performs processing in which light source information generated on the basis of a detection value of the sensor is used as metadata that is used in development processing for YC-raw data.

(20)

An image processing method including performing conversion processing, into an image sensor output format, on YC-raw data that is image data obtained by performing pre-white balance processing, demosaicing, and a YC conversion processing on image data in the image sensor output format, and further performing reverse pre-white balance processing with respect to the pre-white balance processing and remosaicing to restore a state prior to the demosaicing.

REFERENCE SIGNS LIST

1 Imaging device
12 Imaging unit
12a Image sensor
14 Recording control unit
Display unit
18 Camera control unit
Image processing unit
23 Sensor unit
Menu screen
41 Setting area
Warning display
46 Color shift area display
70 Information processing device
71 CPU
77 Display unit
78 Audio output unit
79 Recording control unit
100 Control unit

The invention claimed is:

1. An image processing device comprising:

an image processing unit that performs conversion processing, into an image sensor output format, on YC-raw data that is image data obtained by performing pre-white balance processing, demosaicing, and a YC conversion processing on image data in the image sensor output format to produce a converted image data, and further performs reverse pre-white balance processing with respect to the pre-white balance processing, remosaicing and main white balance processing on the converted image data to restore a state prior to the demosaicing.

2. The image processing device according to claim 1, wherein the image processing unit performs development processing on the image data after the remosaicing, a plurality of times with different parameter settings to generate a plurality of developed images.

3. The image processing device according to claim 1, wherein the image processing unit performs the reverse pre-white balance processing, using pre-white balance information in metadata associated with YC-raw data.

4. The image processing device according to claim 1, wherein the image processing unit performs the remosaicing, using sensor array information in metadata associated with YC-raw data.

5. The image processing device according to claim 1, wherein the image processing unit performs the main white balance processing using light source information in metadata associated with YC-raw data.

6. An image processing device comprising:

an image processing unit that performs conversion processing, into an image sensor output format, on YC-raw data that is image data obtained by performing pre-white balance processing, demosaicing, and a YC conversion processing on image data in the image sensor output format, and further performs reverse pre-white balance processing with respect to the pre-white balance processing and remosaicing to restore a state prior to the demosaicing, wherein the image processing unit performs development processing on the image data after the remosaicing, a plurality of times with different parameter settings to generate a plurality of developed images, and the image processing unit generates difference information compared to a developed image used as a reference, for some of the plurality of developed images.

7. An image processing device comprising:

an image processing unit that performs conversion processing, into an image sensor output format, on YC-raw data that is image data obtained by performing pre-white balance processing, demosaicing, and a YC conversion processing on image data in the image sensor output format, and further performs reverse pre-white balance processing with respect to the pre-white balance processing and remosaicing to restore a state prior to the demosaicing; and a control unit that performs determination processing to determine necessity for color shift correction for YC-raw data and causes the image processing unit to execute the remosaicing in accordance with a determination result.

8. The image processing device according to claim 7, wherein, as the determination processing, the control unit determines necessity for color shift correction, using a difference value between a white balance value obtained for YC-raw data and a white balance value used in the pre-white balance processing for the YC-raw data.

9. The image processing device according to claim 7, wherein as the determination processing, the control unit determines necessity for color shift correction for YC-raw data on a basis of an amount of change in a signal level after the reverse pre-white balance processing.

10. The image processing device according to claim 7, wherein as the determination processing, the control unit determines necessity for color shift correction, using information based on a white balance value used in the pre-white balance processing for YC-raw data and light source information detected during imaging.

11. The image processing device according to claim 7, wherein the control unit is capable of selecting a plurality of processing methods as the determination processing, and performs the determination processing by a processing method selected.

12. The image processing device according to claim 11, wherein the control unit selects the processing method for the determination processing on a basis of a user setting.

13. The image processing device according to claim 11, wherein the control unit automatically selects the processing method for the determination processing.

14. The image processing device according to claim 7, wherein the control unit controls execution of warning in a case where the control unit determines by the determination processing that color shift correction is necessary.

15. The image processing device according to claim 14, wherein the control unit causes the image processing unit to execute the remosaicing in response to a user operation performed according to the warning.

16. A non-transitory computer readable medium storing a program, the program being executable by at least one processor to perform operations comprising:
   performing conversion processing, into an image sensor output format, on YC-raw data that is image data obtained by performing pre-white balance processing, demosaicing, and a YC conversion processing on image data in the image sensor output format to produce a converted image data; and
   performing reverse pre-white balance processing with respect to the pre-white balance processing, remosaicing and main white balance processing on the converted image data to restore a state prior to the demosaicing.

17. A non-transitory computer readable medium storing a program, the program being executable by at least one processor to perform operations comprising:
   performing conversion processing, into an image sensor output format, on YC-raw data that is image data obtained by performing pre-white balance processing, demosaicing, and a YC conversion processing on image data in the image sensor output format;
   performing reverse pre-white balance processing with respect to the pre-white balance processing and remosaicing to restore a state prior to the demosaicing;
   performing a determination processing to determine necessity for color shift correction for YC-raw data; and
   executing the remosaicing in accordance with a result of the determination processing.

18. The non-transitory computer readable medium according to claim 17, wherein the determination processing includes determining necessity for color shift correction, using a difference value between a white balance value obtained for YC-raw data and a white balance value used in the pre-white balance processing for the YC-raw data.

19. The non-transitory computer readable medium according to claim 17, wherein as the determination processing includes determining necessity for color shift correction for YC-raw data on a basis of an amount of change in a signal level after the reverse pre-white balance processing.

20. The non-transitory computer readable medium according to claim 17, wherein the determination processing includes determining necessity for color shift correction, using information based on a white balance value used in the pre-white balance processing for YC-raw data and light source information detected during imaging.

* * * * *